US011663040B2

(12) United States Patent
Tatara et al.

(10) Patent No.: US 11,663,040 B2
(45) Date of Patent: May 30, 2023

(54) COMPUTER SYSTEM AND RESOURCE REALLOCATION METHOD

(71) Applicant: HITACHI, LTD., Tokyo (JP)

(72) Inventors: Kohei Tatara, Tokyo (JP); Yoshinori Ohira, Tokyo (JP); Masakuni Agetsuma, Tokyo (JP)

(73) Assignee: HITACHI, LTD., Tokyo (JP)

( * ) Notice: Subject to any disclaimer, the term of this patent is extended or adjusted under 35 U.S.C. 154(b) by 127 days.

(21) Appl. No.: 17/206,660

(22) Filed: Mar. 19, 2021

(65) Prior Publication Data

US 2022/0100565 A1 Mar. 31, 2022

(30) Foreign Application Priority Data

Sep. 29, 2020 (JP) .............................. JP2020-163970

(51) Int. Cl.
  *G06F 3/00* (2006.01)
  *G06F 9/50* (2006.01)
  *G06F 9/54* (2006.01)
  *G06F 7/57* (2006.01)

(52) U.S. Cl.
  CPC .............. *G06F 9/5005* (2013.01); *G06F 7/57* (2013.01); *G06F 9/54* (2013.01)

(58) Field of Classification Search
  CPC ........................................................ G06F 9/54
  USPC ........................................................ 719/310
  See application file for complete search history.

(56) References Cited

U.S. PATENT DOCUMENTS

| 5,165,009 A | * | 11/1992 | Watanabe | ............... | G06N 3/063 |
| | | | | | 706/41 |
| 5,903,914 A | * | 5/1999 | Zulian | ................... | G06F 1/3225 |
| | | | | | 365/228 |
| 6,192,384 B1 | * | 2/2001 | Dally | .................... | G06F 9/3885 |
| | | | | | 712/E9.046 |

(Continued)

FOREIGN PATENT DOCUMENTS

JP 2007508623 A * 5/2007

OTHER PUBLICATIONS

Srinivas, Algorithms for Hardware Allocation in Data Path Synthesis. (Year: 1989).*

(Continued)

*Primary Examiner* — Lechi Truong
(74) *Attorney, Agent, or Firm* — Volpe Koenig

(57) ABSTRACT

The computer system includes a node including a processor and a memory, and the processor and the memory serve as arithmetic operation resources. The computer system has an application program that operates using the arithmetic operation resources, and a storage controlling program that operates using the arithmetic operation resources for processing data to be inputted to and outputted from a storage device by the application program. The computer system has use resource amount information that associates operation states of the application program and the arithmetic operation resources that are to be used by the application program and the storage controlling program. The computer system changes allocation of the arithmetic operation resources to the application program and the storage controlling program used by the application program on the basis of an operation state of the application program and the use resource amount information.

9 Claims, 20 Drawing Sheets

(56) References Cited

U.S. PATENT DOCUMENTS

| | | |
|---|---|---|
| 8,386,610 B2 | 2/2013 | Yahalom et al. |
| 2008/0007765 A1* | 1/2008 | Ogata ................... G06F 9/505 |
| | | 358/1.15 |
| 2011/0231860 A1* | 9/2011 | Kazama ............... G06F 9/5094 |
| | | 718/105 |
| 2017/0031727 A1* | 2/2017 | Koyanagi ............... G06F 9/505 |
| 2017/0344365 A1* | 11/2017 | Nakamoto .............. G06F 17/11 |
| 2019/0392323 A1* | 12/2019 | Yan ........................ G06N 3/048 |

OTHER PUBLICATIONS

Zhang Lin, Research and Implement of High Availability for Web Server Cluster System. (Year: 2009).*

* cited by examiner

FIG.5

STORAGE CONTROLLING SOFTWARE — 54

COMMAND CONTROLLING PROGRAM — 541

CONFIGURATION CONTROLLING PROGRAM — 542

CONFIGURATION INFORMATION MANAGEMENT TABLE — 543

CLUSTER MANAGEMENT TABLE — 5431

| CLUSTER NUMBER | BELONGING NODE NUMBER |
|---|---|
| CLUSTER #1 | NODE #1, NODE #2, NODE #3 |
| CLUSTER #2 | NODE #4, NODE #5, NODE #6 |
| CLUSTER #3 | NODE #7, NODE #8, NODE #9 |

VOLUME MANAGEMENT TABLE — 5432

| NODE NUMBER | VOLUME NUMBER |
|---|---|
| NODE #1 | VOLUME #1, VOLUME #2, ⋯ |
| NODE #2 | VOLUME #101, VOLUME #102, ⋯ |
| NODE #3 | VOLUME #201, VOLUME #202, ⋯ |

FIG.7

| REQUIRED RESOURCE AMOUNT TABLE 341 | | | | | | | |
|---|---|---|---|---|---|---|---|
| SOFTWARE | SOFTWARE STATE | APPLICATION | | | | STORAGE | |
| | | CPU CORE NUMBER | MEMORY CAPACITY | DISK NUMBER | NW PORT NUMBER | CPU CORE NUMBER | MEMORY CAPACITY |
| USER VM | DURING ACTIVATION OF VIRTUAL DESKTOP | 1 | 2 | 3 | 1 | 2 | 3 |
| USER VM | COMPLETION OF ACTIVATION OF VIRTUAL DESKTOP | 1 | 3 | 1 | 1 | 1 | 1 |
| ... | ... | ... | ... | ... | ... | ... | ... |
| USER APPLICATION | DURING DATA SORTING, TOTALIZATION PROCESS | 2 | 2 | 2 | 2 | 1 | 3 |
| | ... | ... | ... | ... | ... | ... | ... |

SOFTWARE MANAGEMENT TABLE 342

| NODE NUMBER | HYPERVISOR | VIRTUAL MACHINE | OPERATING SOFTWARE | USED VOLUME |
|---|---|---|---|---|
| NODE #1 | NONE | NONE | DATABASE #1 | VOLUME #1 |
| NODE #1 | NONE | NONE | ANALYSIS APPLICATION #1 | VOLUME #2 |
| NODE #1 | HYPERVISOR #1 | USER VM #1 | VIRTUAL DESKTOP #1 | VOLUME #3 |
| NODE #1 | HYPERVISOR #1 | USER VM #1 | VIRTUAL DESKTOP #2 | VOLUME #4 |
| NODE #1 | HYPERVISOR #1 | STORAGE VM #2 | STORAGE CONTROLLING SOFTWARE #1 | VOLUME #5 |
| NODE #1 | HYPERVISOR #1 | USER VM #3 | ANALYSIS APPLICATION #2 | VOLUME #6 |
| ... | ... | ... | ... | ... |
| NODE #2 | HYPERVISOR #2 | USER VM #4 | DATABASE #2 | VOLUME #7 |
| NODE #3 | NONE | NONE | ANALYSIS APPLICATION #3 | VOLUME #8 |
| ... | ... | ... | ... | ... |

| RESOURCE ALLOCATION STATE MANAGEMENT TABLE | | | | |
|---|---|---|---|---|
| APPLICATION NAME | CPU SCORE NUMBER | MEMORY CAPACITY | DISK NUMBER | NW PORT NUMBER |
| VIRTUAL DESKTOP #1 | 1 | 2 | 3 | 1 |
| VIRTUAL DESKTOP #2 | 1 | 2 | 3 | 1 |
| DATABASE #1 | 2 | 2 | 2 | 1 |
| DATABASE #2 | 2 | 2 | 2 | 1 |
| ANALYSIS APPLICATION #1 | 2 | 2 | 2 | 2 |
| ANALYSIS APPLICATION #2 | 2 | 2 | 2 | 2 |
| ANALYSIS APPLICATION #3 | 2 | 2 | 2 | 2 |
| STORAGE CONTROLLING SOFTWARE #1 | 3 | 2 | 4 | 2 |
| HYPERVISOR #1 | 2 | 1 | 0 | 0 |
| ... | ... | ... | ... | ... |

OPERATION STATE MANAGEMENT TABLE — 35

STATE FEATURE TABLE — 351

| SOFTWARE STATE | FEATURE |
|---|---|
| DURING ACTIVATION OF VIRTUAL DESKTOP | ACTIVATION STARTING MESSAGE IS DESCRIBED INTO LOG FILE OF OS |
| ... | |
| DURING DATA SORTING, TOTALIZATION PROCESS | DATA CORRECTION PROCESS IS CALLED FROM DATA READING OUT PROCESS |
| ... | |

SOFTWARE OPERATION STATE MANAGEMENT TABLE — 352

| SOFTWARE NAME | SOFTWARE OPERATION STATE |
|---|---|
| VIRTUAL DESKTOP #1 | DURING ACTIVATION OF VIRTUAL MACHINE & VIRTUAL DESKTOP |
| VIRTUAL DESKTOP #2 | COMPLETION OF VIRTUAL DESKTOP ACTIVATION (DURING USER WORK) |
| DATABASE #1 | DURING ONLINE TRANSACTION PROCESS |
| DATABASE #2 | DURING TABLE SHARDING PROCESS |
| ANALYSIS APPLICATION #1 | DURING DATA READING OUT |
| ANALYSIS APPLICATION #2 | DURING DATA SORTING, TOTALIZATION PROCESS |
| ANALYSIS APPLICATION #3 | DURING DATA SORTING, TOTALIZATION PROCESS |
| ... | ... |

FIG.11

IO MONITOR INFORMATION MANAGEMENT TABLE

*IO PAST STATISTICS TABLE*

| SOFTWARE STATE | RANDOM READ IO NUMBER | RANDOM WRITE IO NUMBER | SEQUENTIAL READ IO NUMBER | SEQUENTIAL WRITE IO NUMBER |
|---|---|---|---|---|
| DURING VIRTUAL DESKTOP ACTIVATION | 30 | 50 | 20 | 30 |
| ... | ... | ... | ... | ... |
| DURING DATA SORTING, TOTALIZATION PROCESS | 80 | 30 | 50 | 30 |
| ... | ... | ... | ... | ... |

*IO COUNT TABLE*

| SOFTWARE NAME | RANDOM READ IO NUMBER | RANDOM WRITE IO NUMBER | SEQUENTIAL READ IO NUMBER | SEQUENTIAL WRITE IO NUMBER |
|---|---|---|---|---|
| VIRTUAL DESKTOP #1 | 300 | 200 | 50 | 20 |
| ... | ... | ... | ... | ... |
| DATABASE #1 | 100 | 100 | 40 | 50 |
| ... | ... | ... | ... | ... |
| ANALYSIS APPLICATION #1 | 80 | 300 | 50 | 30 |
| ... | ... | ... | ... | ... |

COMPUTER SYSTEM AND RESOURCE REALLOCATION METHOD

BACKGROUND OF THE INVENTION

1. Field of the Invention

The present invention relates to a computer system and a resource reallocation method.

2. Description of the Related Art

The importance of software is increasing in various industrial fields, and it is typical to execute a plurality of pieces of software at the same time. Since software operates using arithmetic operation resources, how to distribute arithmetic resources in a case of causing a plurality of pieces of software to be operated becomes problematic. U.S. Pat. No. 8,386,610 discloses an invention that uniformizes the load of a storage in a virtual environment.

SUMMARY OF THE INVENTION

In the invention disclosed in U.S. Pat. No. 8,386,610, there is room for improvement in allocation of arithmetic operation resources to a storage controlling program.

According to a first aspect of the present invention, there is provided a computer system including a node including a processor and a memory, in which the processor and the memory serve as arithmetic operation resources, the computer system has an application program that operates using the arithmetic operation resources and a storage controlling program that operates using the arithmetic operation resources for processing data to be inputted to and outputted from a storage device by the application program, the computer system has use resource amount information that associates operation states of the application program and the arithmetic operation resources that are to be used by the application program and the storage controlling program, and the computer system changes allocation of the arithmetic operation resources to the application program and the storage controlling program used by the application program on a basis of an operation state of the application program and the use resource amount information.

According to a second aspect of the present invention, there is provided a resource reallocation method executed by one or a plurality of arithmetic operation devices included in a computer system that includes a node including a processor and a memory, in which the processor and the memory serve as arithmetic operation resources, the computer system has an application program that operates using the arithmetic operation resources and a storage controlling program that operates using the arithmetic operation resources for processing data to be inputted to and outputted from a storage device by the application program, and the computer system has use resource amount information that associates operation states of the application program and the arithmetic operation resources that are to be used by the application program and the storage controlling program, the resource reallocation method including changing allocation of the arithmetic operation resources to the application program and the storage controlling program used by the application program on a basis of an operation state of the application program and the use resource amount information.

According to the present invention, allocation of the arithmetic operation resources to the storage controlling program suitable for the operation state of software can be performed.

BRIEF DESCRIPTION OF THE DRAWINGS

FIG. 5 is a conceptual diagram depicting a configuration of storage controlling software;
FIG. 7 is a view depicting an example of a required resource amount table;
FIG. 8 is a view depicting an example of a software management table;
FIG. 9 is a view depicting an example of a resource allocation state management table;
FIG. 10 is a view depicting an example of an operation state management table;
FIG. 11 is a view depicting an example of an input/output (IO) monitor information management table.

DESCRIPTION OF THE PREFERRED EMBODIMENTS

Embodiment 1

In the following, a first embodiment of the computer system according to the present invention is described with reference to FIGS. 1 to 16. In the description of the present embodiment, the terms "application," "appli," "program," and "software" have same meanings. In the present embodiment, while various kinds of information are referred to as "table" and indicated in the form of a table, this merely indicates the concept so as to facilitate understandings, and some other representations may be used. In other words, in the present embodiment, "table" can be referred to as "information."

Figure 1:
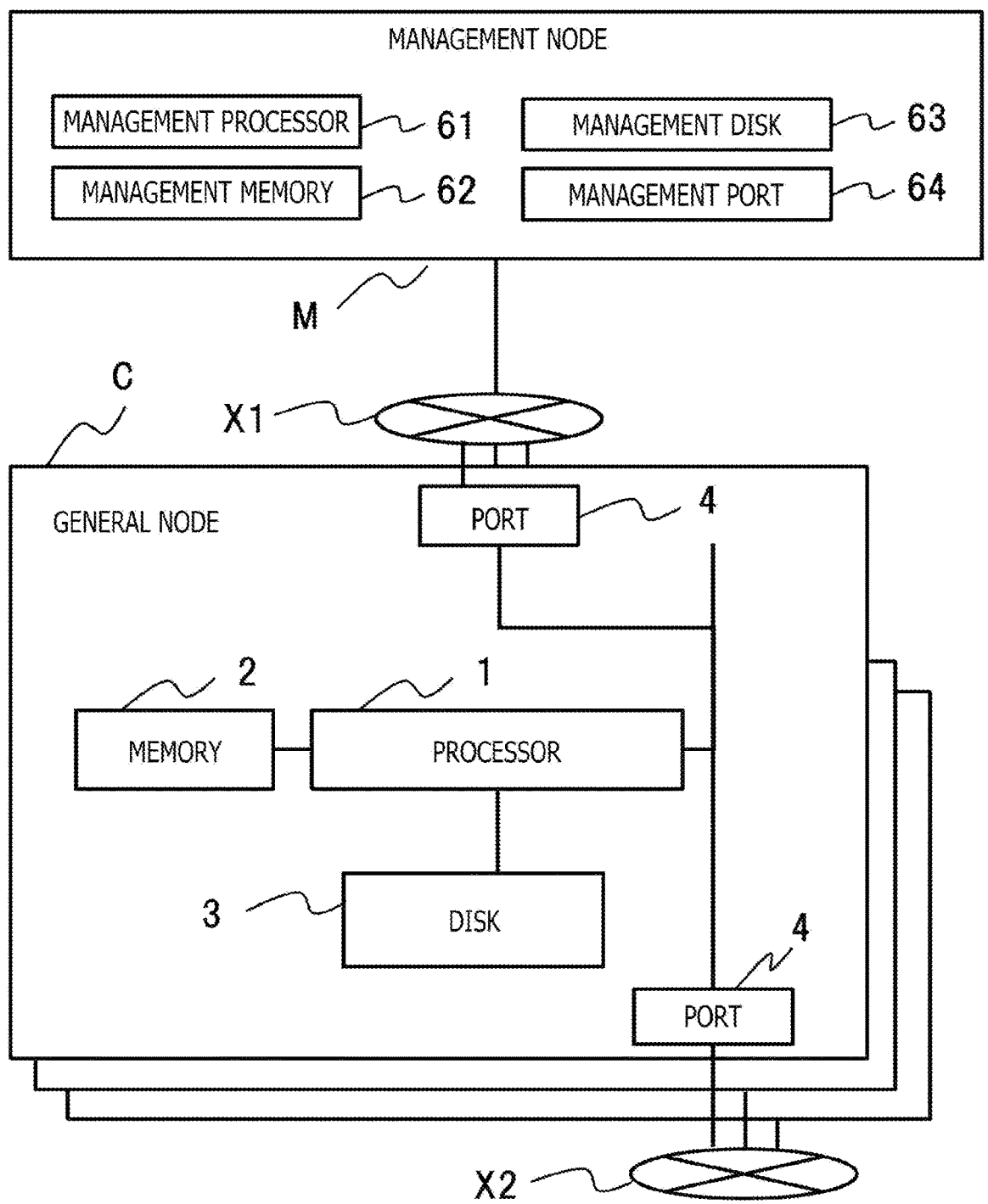
FIG. 1 is a block diagram of an overall computer system.

FIG. 1 is a block diagram of an overall computer system. The computer system includes a single management node M and a plurality of general nodes C. The management node M and the general nodes C are connected to each other through a first network X1, and the general nodes C are connected to each other through a second network X2. However, the management node M and the general nodes C may be connected directly to each other, and the general nodes C may be connected directly to each other.

Each of the general nodes C includes at least one processor 1, at least one memory 2, at least one disk 3, and at least one port 4. In the following description, the processor 1, the memory 2, the disk 3, and the port 4 are collectively referred to as arithmetic operation resources R. The processor 1 is a central processing unit (CPU). A plurality of arithmetic operation cores may be included in the processor 1, and a single arithmetic core may support a hardware multi-threading technology. The memory 2 is a readable and writable storage device, for example, a volatile semiconductor memory.

The disk 3 is a nonvolatile storage device and is, for example, a hard disk drive, an solid state drive (SSD), an non-volatile memory express (NVMe), a storage class memory (SCM) or the like. The port 4 is a communication interface that performs communication of the general node C with the outside such as, for example, a network interface card (NIC).

The management node M includes a management processor 61 that is a central processing unit, a management memory 62 that is a readable and writable storage device, a management disk 63 that is a nonvolatile storage device, and a management port 64. The management processor 61 implements functions hereinafter described by developing a program stored in the management disk 63 to the management memory 62 and executing the program.

Figure 2:
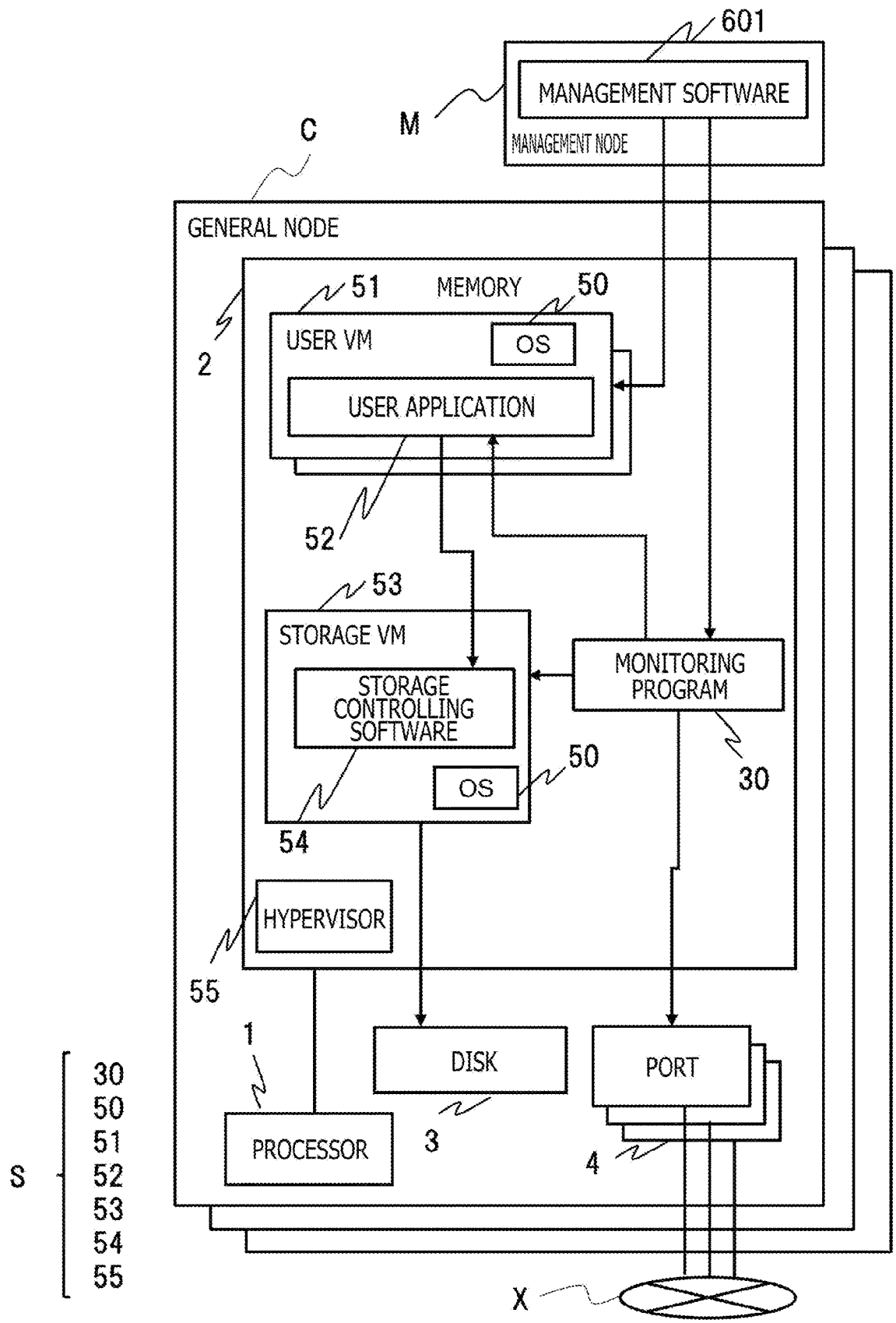
FIG. 2 is a functional block diagram of the computer system.

FIG. 2 is a functional block diagram of the computer system. The management node M has management software 601. The management software 601 activates a user application 52 on the basis of an operation instruction of an operator. Each general node C includes a hypervisor 55, a plurality of virtual machines each of which is hereinafter referred to as a "VM" that operates on the hypervisor 55, and a monitoring program 30. Such VMs are classified into a user VM 51 and a storage VM 53 that controls storage. Each VM has an operating system, hereinafter referred to as an OS, 50 incorporated therein. Each of the user VMs 51 has the user application 52. The storage VM 53 has storage controlling software 54 for managing the disk 3.

In the following description, the monitoring program 30, the OS 50, the user VM 51, the user application 52, the storage VM 53, the storage controlling software 54, and the hypervisor 55 are correctively referred to as software S. The software S is stored in the disk 3 and is developed to the memory 2 and executed by the processor 1. The monitoring program 30 is hereinafter referred to sometimes as "monitoring unit."

Since the user VM 51, the storage VM 53, and the hypervisor 55 provide a virtual environment, they can be called "virtual environment providing software." Since the user application 52 and the storage controlling software 54 operate in a virtual environment implemented by the virtual environment providing software, they can be called "virtual environment utilization software." Since the user application 52 accesses the disk 3 through the storage controlling software 54 that controls the disk 3, it can be called "virtual disk utilization software."

The monitoring program 30 monitors operation of the software S and changes, if a state determined in advance by the software S is entered, resources to be allocated to the software S. The monitoring program 30 has a function for establishing connection to the user VM 51 or the storage VM 53 to instruct the same to change a cluster configuration or the like. Further, the monitoring program 30 has a function for designating a job schedule hereinafter described and causing the software to be operated according to a set schedule.

The monitoring program 30 monitors the behavior of the user application 52 that operates in the user VM 51 and changes, if it observes a predetermined behavior, resources to be allocated individually to the user VM 51 and the storage VM 53. However, the monitoring program 30 may receive a notification from the management software 40 when the management software 40 transmits an operation instruction to the user VM 51.

The user application 52 is activated according to an operation instruction from the management software 40. The user application 52 performs reading out and writing into a volume provided by the storage controlling software 54. The monitoring program 30 is software that monitors the operation state of the application, which is hereinafter referred to as "software state," and performs reallocation of resource amounts to the user VM 51 and the storage VM 53 according to the operation state of the application.

Figure 3:
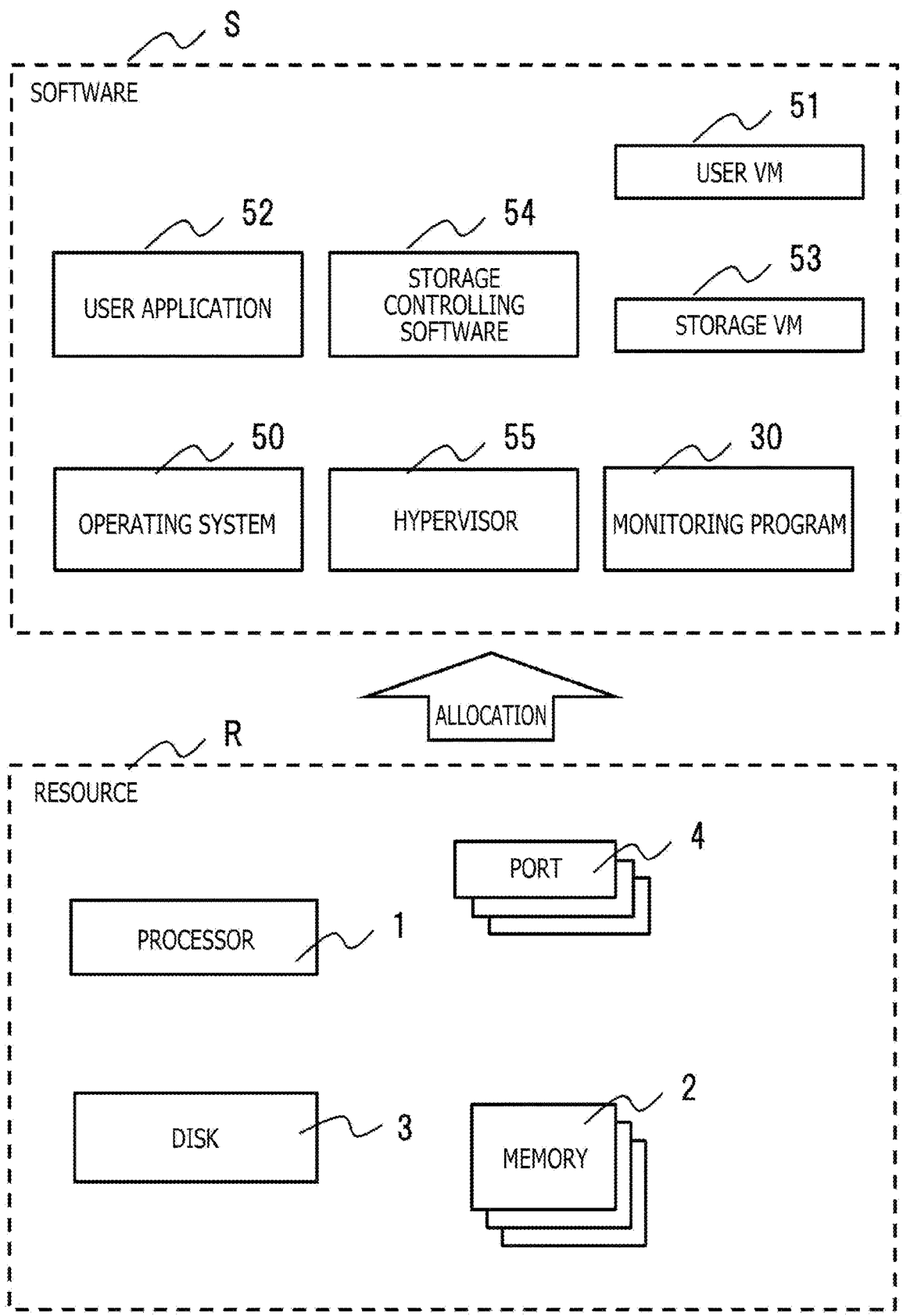
FIG. 3 is a conceptual diagram depicting a relation between arithmetic operation resources and software.

FIG. 3 is a conceptual diagram depicting a relation between arithmetic operation resources R and software S. The arithmetic operation resources R included in the general node C include the processor 1, the memory 2, the disk 3, and the port 4 as described hereinabove. The arithmetic operation resources R are allocated to the software S that includes an OS 50, a user VM 51, a user application 52, a storage VM 53, storage controlling software 54, and a hypervisor 55. The allocation of the arithmetic operation resources R to the software S is changed on the basis of the operation state of the software S as hereinafter described.

Figure 4:
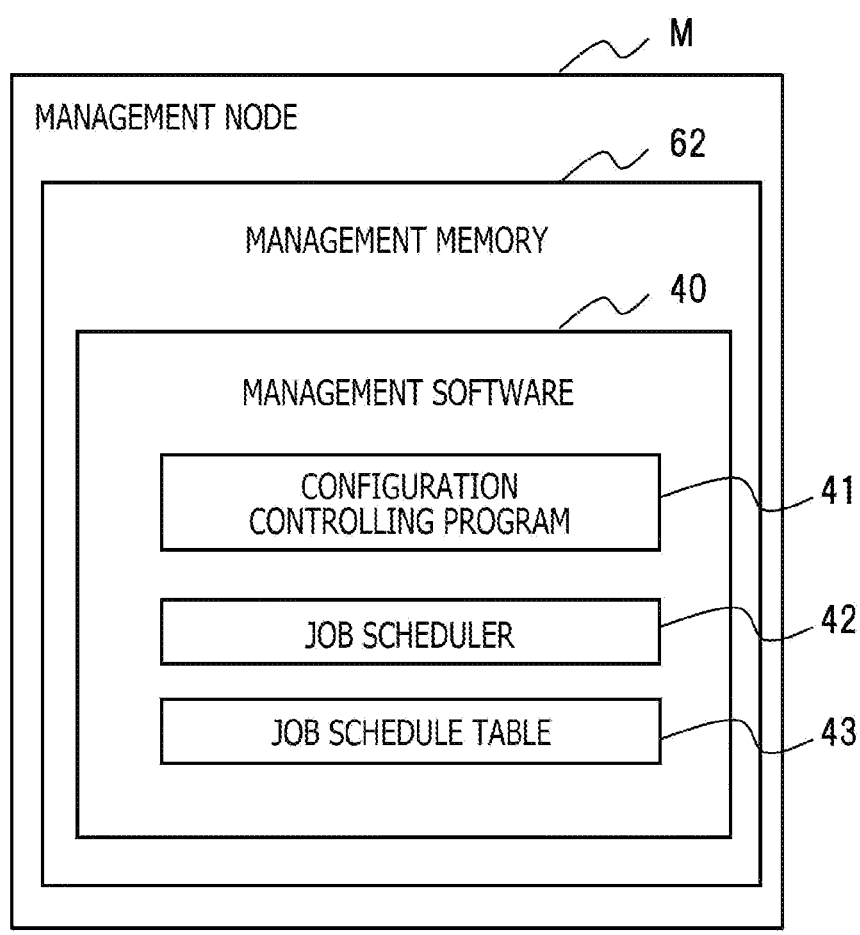
FIG. 4 is a conceptual diagram depicting a configuration of management software.

FIG. 4 is a conceptual diagram depicting a configuration of the management software 40 included in the management node M. The management software 40 is developed to a management memory which is a RAM included in the management node M and is executed. The management software 40 includes a configuration controlling program 41, a job scheduler 42, and a job schedule table 43. The configuration controlling program 41 instructs a plurality of general nodes C to configure a cluster. Further, the configuration controlling program 41 causes each of the general nodes C to configure at least one of the user VM 51 and the storage VM 53.

The job scheduler 42 causes a predetermined user application 52 to be operated according to the description of the job schedule table 43. The job schedule table 43 is a table that stores a condition for activating the user application 52. The condition includes, for example, date and time, ending of execution of another user application 52, an increase in the load to any of the general nodes C, occurrence of a failure, and so forth. It is to be noted that the job scheduler 42 and the job schedule table 43 may be included in a general node C in which the storage VM 53 and the user VM 51 operate.

FIG. 5 is a conceptual diagram depicting a configuration of the storage controlling software 54 included in the storage VM 53. The storage controlling software 54 includes a command controlling program 541, a configuration controlling program 542, and a configuration information management table 543. The configuration information management table 543 includes a cluster management table 5431 and a volume management table 5432.

The command controlling program 541 receives an IO command, namely, a read command or a write command, from the user application 52, interprets the command and performs an IO process using a port or a disk. The reading process is a process of reading in data from a disk allocated to a volume. The writing process is a process of writing data on a disk allocated to a volume. It is to be noted that, in the writing process, data may be duplicated between nodes through a port in order to make the data redundant. The storage controlling software 54 creates a volume from a disk according to an instruction from the management software such that it can be accessed from application software on the user VM 51. The processes mentioned are performed by the configuration controlling program 542.

The cluster management table 5431 is a table indicating a relation between the general nodes C and clusters, namely, indicating identification information of general nodes C included in a specific cluster. The information included in the cluster management table 5431 is common to all storage VMs 53 belonging to all clusters. The volume management table 5432 is a table indicating a relation between volumes and general nodes, namely, indicating identification information of volumes included in a specific node. The volume may be any of a logical storage region and a physical storage region.

Figure 6:
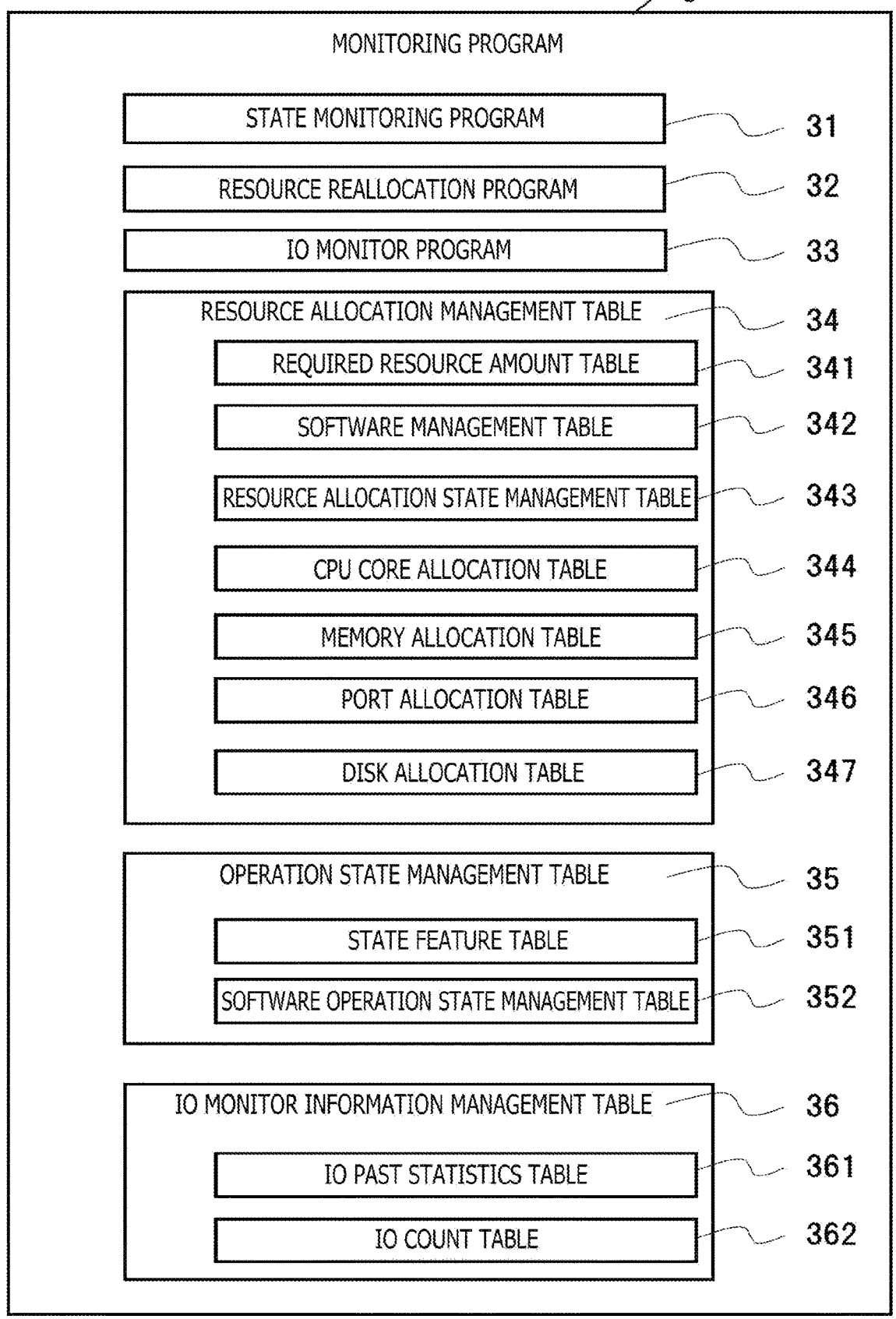
FIG. 6 is a conceptual diagram depicting a configuration of a monitoring program.

FIG. 6 is a conceptual diagram depicting a configuration of the monitoring program 30. The monitoring program 30 includes a state monitoring program 31, a resource reallocation program 32, an IO monitor program 33, a resource allocation management table 34, an operation state management table 35, and an IO monitor information management table 36. The resource allocation management table 34 includes a required resource amount table 341, a software management table 342, a resource allocation state management table 343, a CPU core allocation table 344, a memory allocation table 345, a port allocation table 346, and a disk allocation table 347. The operation state management table 35 includes a state feature table 351 and a software operation state management table 352. The IO monitor information management table 36 includes an IO past statistics table 361 and an IO count table 362.

The state monitoring program 31 monitors the operation state of the software S and changes the value of the field of "software state" in the operation state management table 35. The resource reallocation program 32 refers to the required resource amount table 341 on the basis of the software states of individual pieces of software included in the software S to perform resource reallocation optimum to the individual pieces of software. The IO monitor program 33 counts an IO processing number for each IO pattern for each piece of software and stores each IO processing number into the IO count table 362. The IO pattern includes random read, random write, sequential read, and sequential write.

The required resource amount table 341 is a table indicating, for each piece of software and for each software state, a resource amount to be allocated for optimum operation to the software, which is hereinafter referred to as "required resource amount." The information indicated in the required resource amount table 341 is common to all nodes and is created in advance. In the present embodiment, rewriting of the required resource amount table 341 is not performed.

The software management table 342 is a table that indicates a list of pieces of software currently operating in the individual nodes, operation states of the pieces of software, and so forth. The software management table 342 is updated after every predetermined interval of time or at the timing of activation or ending of each piece of software. The resource allocation state management table 343 is a table indicating resources allocated to the individual applications. The resource allocation state management table 343 is updated every time resources to be allocated to software change.

The CPU core allocation table 344 is a table indicating a list of all CPU cores included in the general nodes C and indicating presence or absence of allocation of each core to the software S. The memory allocation table 345 is a table indicating a list of all memory regions included in the general nodes C and indicating presence or absence of allocation of the memory regions to the software S. The memory may be allocated in a unit of a page of a fixed length or may be allocated in a variable size.

The port allocation table 346 is a table indicating a list of all ports included in the general nodes C and indicating presence or absence of allocation of the ports to the software S. The disk allocation table 347 is a table indicating a list of all disks included in the general nodes C and indicating presence or absence of allocation of the disks to the software S. It is to be noted that the software S may be allocated in a unit of a fixed length block in a disk in place of being allocated in a unit of a disk.

FIG. 7 is a view depicting an example of the required resource amount table 341 included in the resource allocation management table 34. The required resource amount table 341 has a plurality of records each of which has fields for software 3411, a software state 3412, an application 3413, and a storage 3414. The application 3413 has fields for a CPU core number 34131, a memory capacity 34132, a disk number 34133, and a network (NW) port number 34134. The storage 3414 has fields for a CPU core number 34141 and a memory capacity 34142.

In the software 3411, identification information of software targeted by the record, for example, a name of the software, is stored. In the software state 3412, an operation state of the software targeted by the record, namely, a software state, is stored. In the fields for the CPU core number 34131, memory capacity 34132, disk number 34133, and NW port number 34134, a CPU core number, a memory capacity, a disk number, and a network port number to be allocated to the software are stored, respectively. In the fields for the CPU core number 34141 and the memory capacity 34142, a CPU core number and a memory capacity to be allocated to the storage controlling software 54 are stored, respectively.

Numerals stored in the fields for the application 3413 and the storage 3414 in FIG. 7 are exemplary and have an optional correlation with physical amounts. For example, the numerical value stored in the field for the memory capacity 34132 may represent "10 MB" per numerical value "1" or may represent "1 GB." Further, the NW port number 34134 may indicate an allocation number of physical ports 4 or may indicate the number of virtual ports.

The first record in FIG. 7 indicates that, if the user VM 51 is in a state in which the virtual desktop is during activation, then the user VM 51 requires "1" CPU core, "2" memories, "3" disks, and "1" network port. Further, in this case, it is indicated that the storage controlling software 54 in the same general node C requires "2" CPU cores and "3" memories. It is to be noted that "during activation" does not mean operation from a start to an end of execution of the software, but means operation after processing for activating the software is started until the activation is completed.

Meanwhile, the second record in FIG. 7 indicates that, if the user VM 51 is in a state in which activation of the virtual desktop is completed, the user VM 51 requires "1" CPU core, "3" memories, "1" disk, and "1" network port. In particular, if the software state of the user VM 51 changes from during activation of the virtual desktop to completion of activation of the virtual desktop, then it is desirable to increase the memory capacity and decrease the disk number. It can be recognized that the storage controlling software 54 may similarly decrease the CPU core number and the memory capacity. Since resourced are allocated according to the nature of the state of software in this manner, in a case where the state of the software changes, the increase or decrease differs for each combination of a resource and a program, and increase and decrease in allocation sometimes occur simultaneously.

It is to be noted that, though not exemplified in FIG. 7, also in regard to the storage controlling software 54, a piece of software to which the allocation increases and a piece of software to which the allocation decreases may occur simultaneously according to the software state. For example, the required resource amount table 341 may be configured such that, when the user VM 51 transits from a certain software state to another software state, although the CPU core number increases, the memory capacity decreases.

FIG. 8 is a view depicting an example of the software management table 342 included in the resource allocation management table 34. The software management table 342 has a plurality of records each of which has fields for a node number 3421, a hypervisor 3422, a virtual machine 3423, operation software 3424, and a used volume 3425.

In the node number 3421, information for identifying a general node C in which the software is operating is stored. For example, six records from the top depicted in FIG. 8 each have "node #1" in the node number 3421, and it is recognized that they are descriptions relating to the same node. In the hypervisor 3422, information for identifying a hypervisor that hosts a virtual machine in which the software operates. In the virtual machine 3423, information for identifying a virtual machine in which the software operates is stored. However, in a case where the software is not operating on a virtual machine, namely, in a case where the software operates in bear metal, since a hypervisor is not used either, "none" is described in the fields for the hypervisor 3422 and the virtual machine 3423.

In the operation software 3424, information for identifying the software is stored. However, since a plurality of same pieces of software can be activated simultaneously, in order to distinguish the individual pieces of software, in the present embodiment, "#1" or "#2" is added to the name of a piece of software. In the used volume 3425, information for identifying a volume being used by the software is stored.

FIG. 9 is a view depicting an example of the resource allocation state management table 343. The resource allocation state management table 343 has a plurality of records each of which has fields for an application name 3431, a CPU core number 3432, a memory capacity 3433, a disk number 3434, and an NW port number 3435.

In the application name 3431, information for identifying pieces of software is stored. However, since a plurality of same pieces of software can be activated simultaneously, in order to distinguish the individual pieces of software, in the present embodiment, "#1" or "#2" is added to the name of a piece of software. In the fields for the CPU core number 3432, the memory capacity 3433, the disk number 3434, and the NW port number 3435, a CPU core number, a memory capacity, a disk number and a network port number currently allocated to the piece of software of the record are stored, respectively. It is to be noted that the resource allocation amount to the storage controlling software 54 has such a value that it is the sum total of allocation resource amounts required for storage operation by individual applications.

FIG. 10 is a view depicting an example of the operation state management table 35. The operation state management table 35 includes a state feature table 351 and a software operation state management table 352. The state feature table 351 is a table in which features for allowing the monitoring program 30 to decide the software state of each piece of software are described, for example, in the extensible markup language (XML) format. The software operation state management table 352 is a table into which an operation state of each piece of software is written by the monitoring program 30. The monitoring program 30 decides the software state of each piece of software on the basis of the features described in the state feature table 351.

FIG. 11 is a view depicting an example of the IO monitor information management table 36. The IO monitor information management table 36 includes an IO past statistics table 361 and an IO count table 362. In the IO past statistics table 361, IO numbers for individual software states that are pieces of statistical data obtained in the past, more particularly, a random read IO number, a random write IO number, a sequential read IO number, and a sequential write IO number, are stored. In the IO count table 362, current IO numbers for individual pieces of software are stored. The IO numbers are stored for individual IO patterns similarly as in the IO past statistics table 361. It is to be noted that the IO numbers stored in the IO past statistics table 361 and the IO count table 362 may be actual count numbers or may be count numbers for every predetermined period of time.

Figure 12:
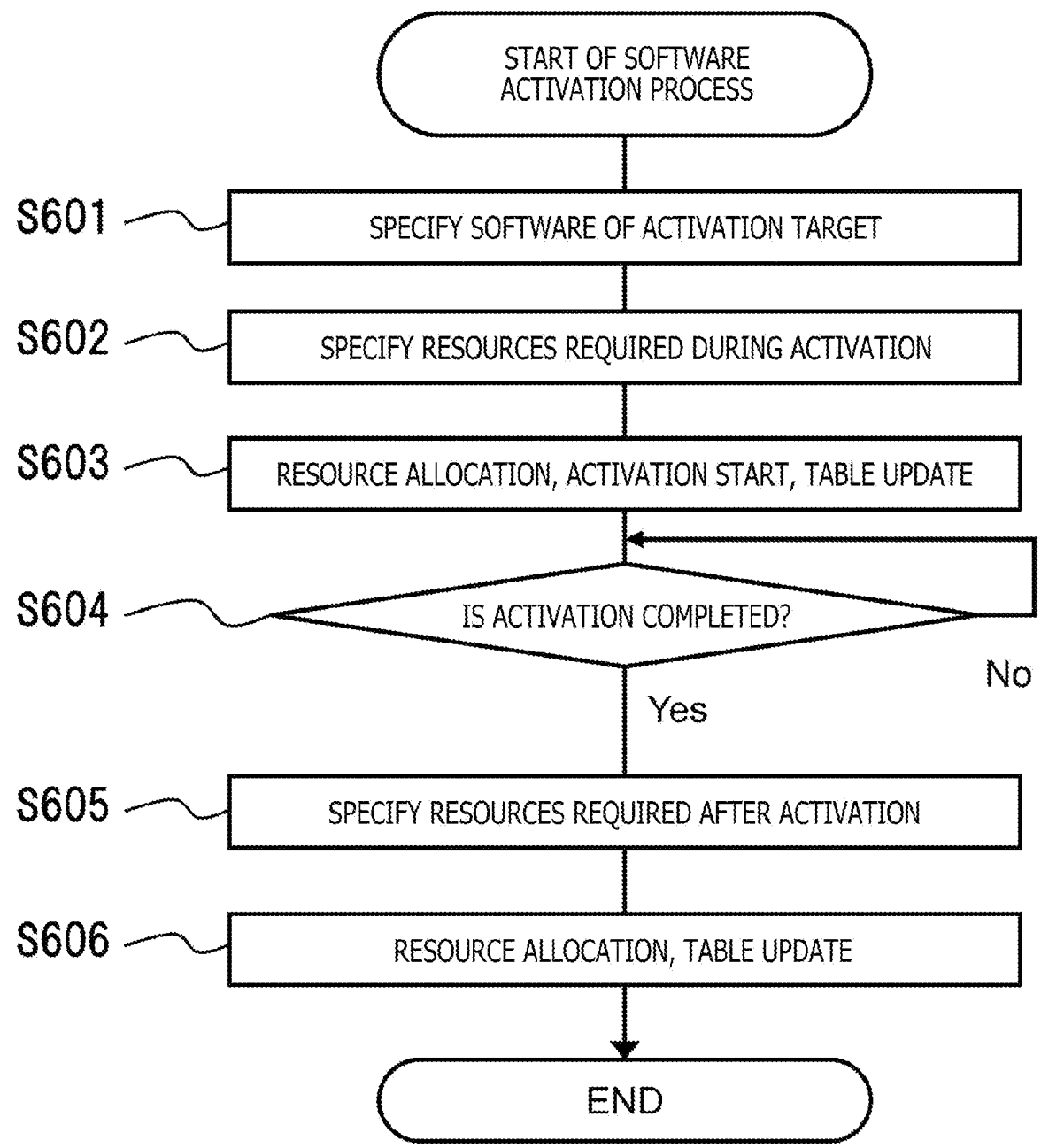
FIG. 12 is a flow chart depicting a software activation process that is executed by the monitoring program.

FIG. 12 is a flow chart indicating a software activation process by the monitoring program 30. If the user uses the management software 40 of the management node M to instruct activation of any of pieces of software, then the monitoring program 30 of any of the general nodes C selected by the management software 40 performs the following process. It is to be noted that, in the following description, the piece of software whose activation is instructed by the user is referred to as "designated piece of software."

The monitoring program 30 first specifies a designated piece of software at step S601. The present step specifies a designated piece of software by collating an identifier included in the activation instruction received from the management node M and a correspondence table not depicted with each other. Then at step S602, the monitoring program 30 refers to the required resource amount table 341 to specify resources that are required during activation of the designated piece of software. Then at step S603, the monitoring program 30 allocates the resources specified at step S602 to the designated piece of software and starts activation to update required tables. In particular, the monitoring program 30 updates the software management table 342, the resource allocation state management table 343, the CPU core allocation table 344, the memory allocation table 345, the port allocation table 346, the disk allocation table 347, and the software operation state management table 352.

Then at step S604, the monitoring program 30 decides whether or not the activation of the designated piece of software whose activation is started at step S603 is completed. In a case where it is decided that the activation is completed, the monitoring program 30 advances the processing to step S605, but in a case where it is decided that the activation is not completed, the monitoring program 30 executes the step S604 again. At the present step, the monitoring program 30 makes a decision on the basis of the description of the field for the feature in the state feature table 351.

At step S605, the monitoring program 30 refers to the required resource amount table 341 to specify resources required after the activation by the designated piece of software. Then at step S606, the monitoring program 30 allocates the resources specified at step S605 to the designated piece of software and updates the required tables. In particular, the monitoring program 30 updates the software management table 342, the resource allocation state management table 343, the CPU core allocation table 344, the memory allocation table 345, the port allocation table 346, the disk allocation table 347, and the software operation state management table 352 as occasion demands. For example, in a case where the numbers of CPU cores during activation and after activation are equal to each other in the required resource amount table 341, since the CPU core allocation table 344 does not require update, it is not updated. The software activation process is performed in such a manner as described above.

It is to be noted that, in a case where required resources cannot be secured at step S603, allocating a smaller number of resources, a notification of this may be issued to the management node M, or else, a notification of failure in activation may be issued to the management node M without allocating a resource. Further, the software activation process may be ended at step S603. In this case, the steps beginning with step S604 are executed by the state monitoring program 31 and the resource reallocation program 32.

Figure 13:
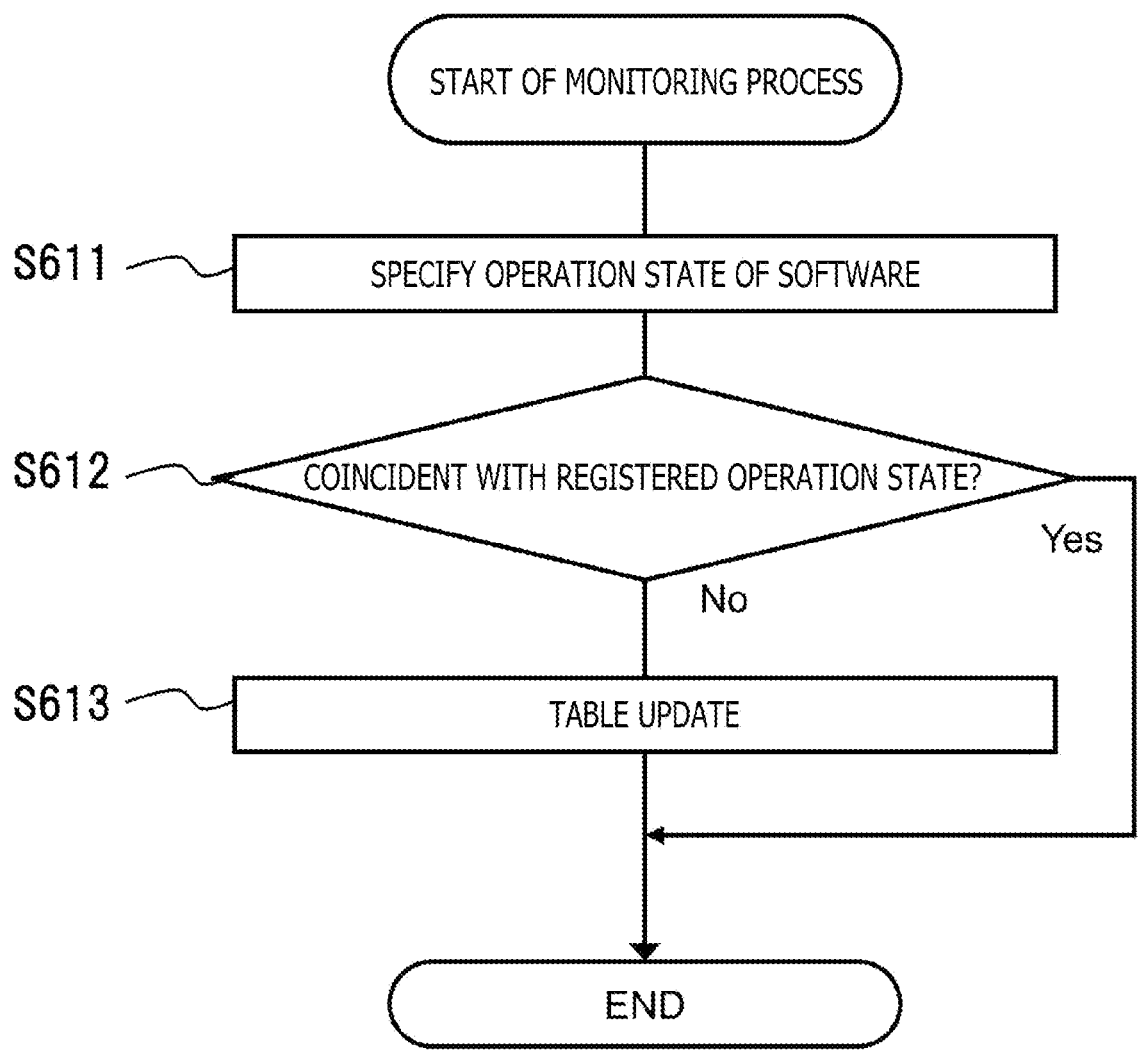
FIG. 13 is a flow chart depicting a monitoring process that is executed by a state monitoring program.

FIG. 13 is a flow chart depicting a monitoring process executed by the state monitoring program 31. The state monitoring program 31 targets all pieces of software that are currently operating to execute a monitoring process in order for the pieces of software, for example, at every predetermined time intervals. In the following description of the monitoring process, the piece of software of the target of monitoring is referred to as "monitoring target piece of software."

In the monitoring process, first at step S611, the state monitoring program 31 refers to the state feature table 351 to specify a software state of a monitoring target piece of software. It is to be noted that, in a case where the software state of the monitoring target piece of software cannot be specified at the present step, the state monitoring program 31 ends the monitoring process and newly executes a monitoring process targeting another piece of software.

Then at step S612, the state monitoring program 31 decides whether or not the software state specified at step S611 and the software state of the monitoring target piece of software recorded in the software operation state management table 352 coincide with each other. In a case where they coincide with each other, the state monitoring program 31 ends the monitoring process, while, in a case where it is decided that they do not coincide with each other, the state monitoring program 31 advances the processing to step S613. At step S613, the state monitoring program 31 rewrites the field for the software state of the monitoring target piece of software in the software operation state management table 352 with the software state specified at step S611 and ends the monitoring process.

Figure 14:
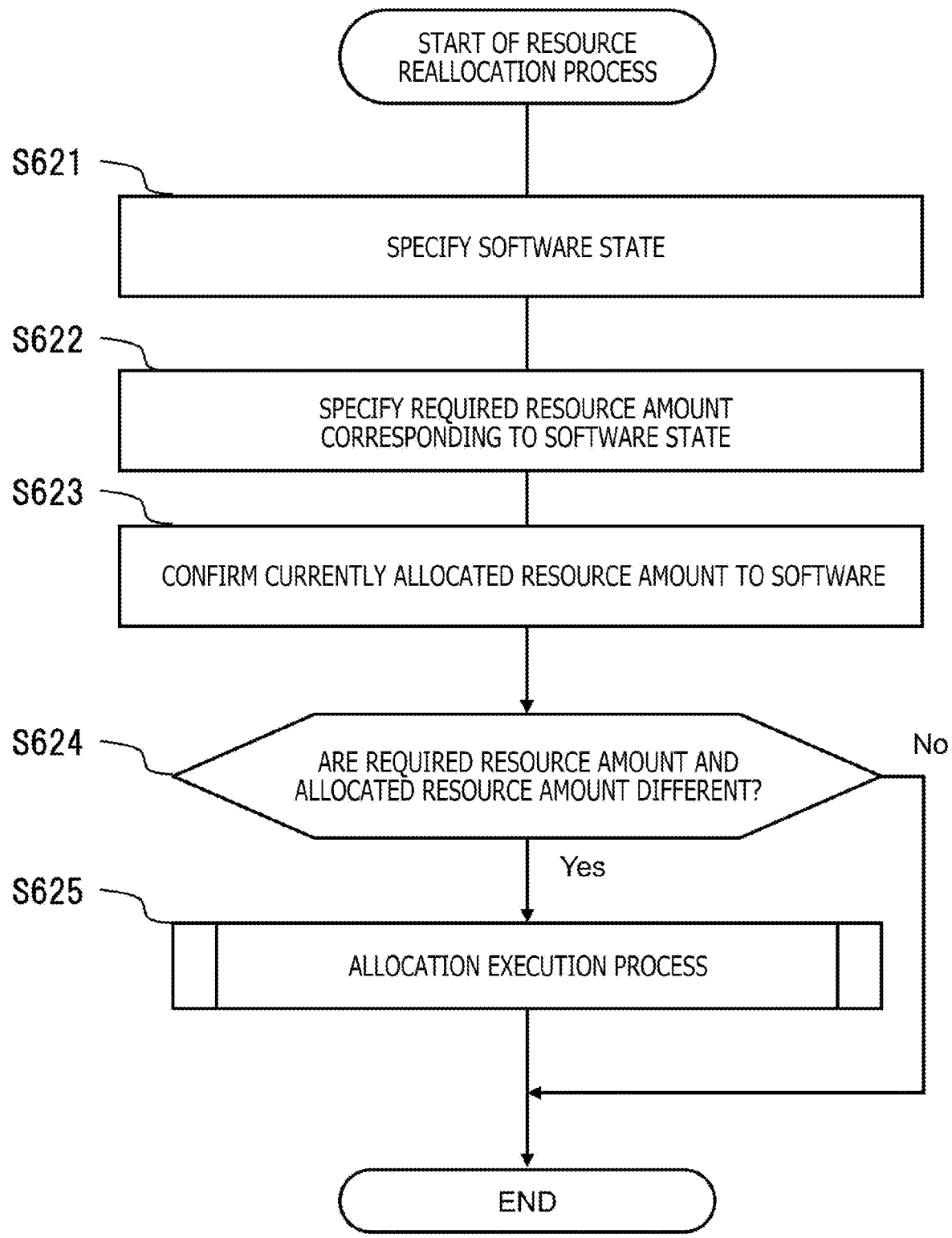
FIG. 14 is a flow chart depicting a resource reallocation process that is executed by a resource reallocation program.

FIG. 14 is a flow chart depicting a resource reallocation process by the resource reallocation program 32. The resource reallocation program 32 executes the resource reallocation process, for example, at predetermined time intervals, targeting all pieces of software that are currently operating. In the following description of the resource reallocation process, one or a plurality of pieces of software to be processed are referred to as a "target piece of software."

In the resource reallocation process, first at step S621, the resource reallocation program 32 refers to the software operation state management table 352 to specify the software state of each of target pieces of software. Then at step S622, the resource reallocation program 32 refers to the required resource amount table 341 to specify a required resource amount corresponding to the current software state of each of the target pieces of software. Then at step S623, the resource reallocation program 32 refers to the resource allocation state management table 343 to confirm allocated resource amounts currently allocated to the individual target pieces of software.

Then at step S624, the resource reallocation program 32 decides whether or not the required resource amounts specified at step S622 and the allocated resource amounts confirmed at step S623 are different from each other. In regard to each piece of software in regard to which it is decided that both resource amounts are different from each other among the target pieces of software, the resource reallocation program 32 advances the processing to step S625, at which it performs an allocation execution process, but in regard to each piece of software in regard to which it is decided that the resource amounts are same as each other, the resource reallocation program 32 immediately ends the resource allocation process. The allocation execution process at step S625 is described below with reference to FIG. 15. It is to be noted that, in the following description, one or a plurality of pieces of software in regard to which an affirmative decision is made at step S624 are referred to as a "reallocation target piece of software."

Figure 15:
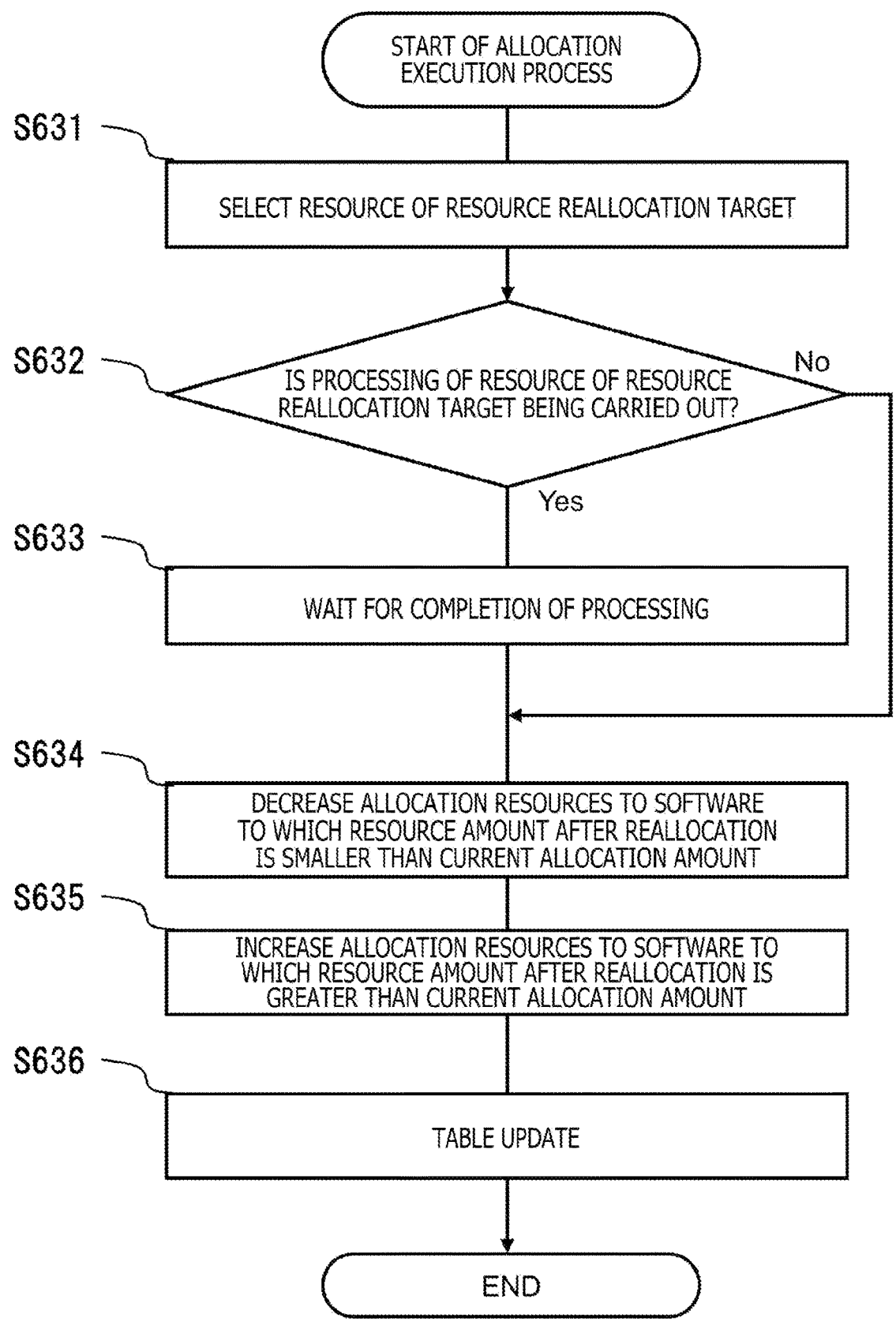
FIG. 15 is a flow chart depicting details of an allocation execution process.

FIG. 15 is a flow chart depicting details of the allocation execution process depicted at step S625 of FIG. 14. In the allocation execution process, the resource reallocation program 32 first selects resources of a reallocation target for individual reallocation target pieces of software at step S631. In particular, the resource reallocation program 32 selects resources whose allocation is to be canceled in a case where resource allocation to the target pieces of software is to be decreased and resources to be allocated newly in a case where resource allocation to the target pieces of software is to be increased.

Then at step S632, the resource reallocation program 32 decides whether or not processing is being carried out for the resources of the resource reallocation target selected at step S631. In a case where the resource reallocation program 32 decides that processing is being carried out for the resources of the reallocation target to any of the reallocation target pieces of software, the processing advances to step S634 after waiting for completion of the processing at step S633. In a case where it is decided that processing is not being carried out for the resources of the reallocation target of all of the reallocation target pieces of software, the processing advances directly to step S634.

At step S634, the resource reallocation program 32 decreases the allocation resources of any piece of software in regard to which the resource amount after the reallocation is smaller than the current allocation amount. At step S635, the resource reallocation program 32 increases the allocation resources of any piece of software in regard to which the resource amount after the reallocation is greater than the current allocation amount. At next step S636, the resource reallocation program 32 updates the tables in order to reflect the resource allocation changed at step S634 and step S635. In particular, the monitoring program 30 updates the software management table 342, the resource allocation state management table 343, the CPU core allocation table 344, the memory allocation table 345, the port allocation table 346, the disk allocation table 347, and the software operation state management table 352. The description given above with reference to FIG. 15 ends therewith.

Figure 16:
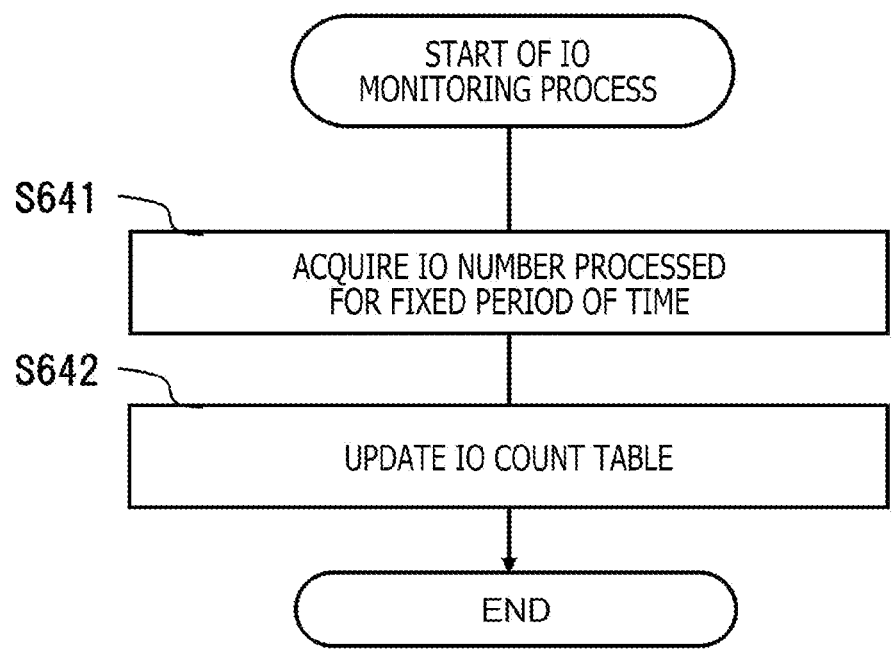
FIG. 16 is a flow chart depicting an IO monitoring process that is executed by an IO monitor program.

FIG. 16 is a flow chart depicting the IO monitoring process executed by the IO monitor program 33. The IO monitor program 33 executes the IO monitoring process after every predetermined interval of time targeting software S that is operating in the general nodes C. At step S641, the IO monitor program 33 acquires an IO number processed by the individual pieces of software for a fixed period of time. It is to be noted that this IO number is totalized for each IO pattern. Then at step S642, the IO monitor program 33 updates the IO count table 362 on the basis of the IO numbers acquired at step S641. The description given with reference to FIG. 16 ends therewith.

According to the first embodiment described above, the following advantageous effects are achieved.

(1) The computer system includes general nodes C each having a processor 1 and a memory 2. In the computer system, the processor 1 and the memory 2 are arithmetic operation resources R. The computer system has user applications 52 that operate using the arithmetic operation resources R and storage controlling software 54 that operates using the arithmetic operation resources R in which the user application 52 processes data that is inputted to or is outputted from the disk 3. The computer system has use resource amount information, namely, a required resource amount table 341, which associates an operation state of the user application 52 and arithmetic operation resources to be used by the user application 52 and the storage controlling software 54 with each other. The computer system changes allocation of the arithmetic operation resources to the user application 52 and the storage controlling software 54 to be used by the user application 52 on the basis of the operation state of the user application 52 and the required resource amount table 341, in YES at step S624 of FIG. 14, at step S625, and in FIG. 15. Therefore, allocation of arithmetic operation resources to a storage controlling program suitable for an operation state of the user application 52 can be performed.

(2) Resources that are arithmetic operation resources to be used by the storage controlling software 54 and that serve as a target of allocation change include a processor and a memory. An allocation arithmetic operation resource change by one time can include an arithmetic operation resource to which the allocation increases and an arithmetic operation resource to which the allocation decreases on the basis of the use resource amount information. Therefore, resources of the storage controlling software 54 can be set optimally according to the software state of the user application 52.

(3) The disk 3 of the computer system includes a state feature table 351 that indicates a feature for each operation state of the user application 52. The monitoring program 30 decides an operation state of software on the basis of the state feature table 351.

(4) The resource reallocation method in the present embodiment is a resource reallocation method executed by one or a plurality of arithmetic operation devices included in a computer system that includes general nodes C each of which includes a processor 1 and a memory 2, namely, by the general nodes C. In the computer system, the processor 1 and the memory 2 are set as arithmetic operation resources R. The computer system has user applications 52 that operate using the arithmetic operation resources R and storage controlling software 54 that operates using the arithmetic operation resources R in which the user application 52 processes data that is inputted to or is outputted from the disk 3. The computer system has use resource amount information, namely, a required resource amount table 341, which associates an operation state of the user application 52 and arithmetic operation resources to be used by the user application 52 and the storage controlling software 54 with each other. The resource reallocation method changes allocation of the arithmetic operation resources to the user application 52 and the storage controlling software 54 to be used by the user application 52 on the basis of the operation state of the user application 52 and the required resource amount table 341, in YES at step S624 of FIG. 14, at step S625, and in FIG. 15. Therefore, allocation of arithmetic operation resources to a storage controlling program suitable for an operation state of the user application 52 can be performed.

(Modification 1)

In the first embodiment described above, the monitoring program 30 allocates arithmetic operation resources R directly to each piece of software. However, the monitoring program 30 may allocate arithmetic operation resources R to a program that provides a virtual environment such that the arithmetic operation resources R are allocated by a load adjusting function of the providing program of the virtual environment. In particular, in the present modification, a virtual environment allocates resources directly to the user applications 52, and the monitoring program 30 indirectly allocates the resources to the user applications 52.

Operation of the resource reallocation program 32 according to the present modification is such as described in the following. First, the resource reallocation program 32 specifies all of user applications 52 operating in the individual user VMs 51. Then, the resource reallocation program 32 specifies a software state of each of the user applications 52 and specifies a required resource amount from the required resource amount table 341. Then, the resource reallocation program 32 totalizes the required resource amounts of the user applications 52 operating in the individual user VMs 51 and allocates the resource amount to the user VMs 51. To each user application 52, the user VM 51 allocates resources.

According to the present modification, the following advantageous effects are obtained. The user application 52 is virtual environment utilizing software and operates in a virtual environment implemented by the user VM 51 and the hypervisor 55 that are the virtual environment providing software. The monitoring program 30 allocates arithmetic operation resources to at least one of the user VM 51 and the hypervisor 55 on the basis of the operation state of the user application 52. Therefore, by allocating the arithmetic operation resources R to the virtual environment in which the software is operating according to the operation state of the software, the resource controlling mechanism in the virtual environment allocates appropriate arithmetic operation resources R to the software. In other words, in the present modification, by allocating arithmetic operation resources R to a virtual environment, the arithmetic operation resources R can be indirectly allocated appropriately to the software.

(Modification 2)

The state monitoring program 31 may decide the software state of each piece of the software S on the basis of the IO processing number of the software S. In particular, the state monitoring program 31 refers to the IO past statistics table 361 and the IO count table 362 to select a software state in which the IO pattern regarding each piece of software S is closest to the value of the IO count table 362.

According to the present modification, the following advantageous effect can be obtained.

(5) The monitoring program 30 decides the operation state of software on the basis of the IO processing number of the software. Therefore, the software state can be decided using the IO processing number whose counting is easy.

(Modification 3)

In the first embodiment described above, the reallocation target of the arithmetic operation resources R is the monitoring program 30, the OS 50, the user VM 51, the user application 52, the storage VM 53, the storage controlling software 54, and the hypervisor 55. However, it is sufficient if the reallocation target of the arithmetic operation resources R is at least one of the monitoring program 30, the OS 50, the user VM 51, the user application 52, the storage VM 53, the storage controlling software 54, and the hypervisor 55.

(Modification 4)

In the first embodiment described hereinabove, arithmetic operation resources R are allocated to a certain piece of software on the basis of the software state of the piece of software. However, in a case where the software operates in a virtual environment, the arithmetic operation resources R to be allocated to a piece of software that provides the virtual environment may be determined on the basis of the software state of the piece of software that is executed in the virtual environment. For example, in the configuration of the firs embodiment, the arithmetic operation resources R may be allocated to the user VM 51 and the hypervisor 55 on the basis of the software state of the software of the user application 52.

(Modification 5)

In the first embodiment described above, the software S is stored in the disk 3 that is part of an arithmetic operation resource R. However, at least part of the software S may be stored in a storage medium other than the disk 3. In other words, at least part of the software S may be read out from a storage region that is not included in the arithmetic operation resource R and the storage region may be rewritten as occasion demands.

(Modification 6)

It is sufficient if the monitoring target of the monitoring program 30 is not the entire software S but is at least one program included in the software S. Further, at least part of the software S may operate not on a virtual machine but on bear metal.

(Modification 7)

In the first embodiment described hereinabove, the monitoring program 30 is not included in any VM. However, the monitoring program 30 may operate partly or entirely on any one of VMs or may be dispersedly incorporated in a plurality of VMs. Further, at least part of the monitoring program 30 may operate in some other than the general nodes C.

(Modification 8)

Although controlling information tables and various kinds of programs are developed on a memory during execution, the programs and the tables may be stored in a nonvolatile region such as a drive.

(Modification 9)

The storage controlling software 54 is not an essential configuration. The individual user applications 52 may directly perform reading and writing on the disk 3.

(Modification 10)

The general node C may implement functions similar to those of the monitoring program 30 that is software by a hardware circuit or a reconfigurable logic circuit in place of the monitoring program 30.

(Modification 11)

It is described in the foregoing description of the first embodiment that the monitoring process depicted in FIG. 13 is executed in a predetermined cycle. However, the state monitoring program 31 may detect a change of the operation state of the user application 52 and execute the monitoring process. For example, in a case where the state feature table 351 is such as depicted in FIG. 10, the state monitoring program 31 normally monitors a log file of the OS such that, if a message to start activation of a virtual desktop is written into the log file, then the state monitoring program 31 detects a change of the software state of the virtual desktop that is one of the user applications 52. Then, the state monitoring program 31 executes the processes at the steps beginning with the step S612 of FIG. 13. However, in this case, after the process depicted in FIG. 13 ends, the resource reallocation process depicted in FIG. 14 is executed immediately. Consequently, if a change of the operation state of the user application 52 is detected, then reallocation of the arithmetic operation resources R is performed immediately.

According to the present modification, the following advantageous effect is obtained.

(6) An operation state of the user application 52 is detected, and allocation of arithmetic operation resources is changed on the basis of the detected operation state of the user application 52 and use resource amount information. Therefore, it is possible to detect an operation state of the user application 52 and allocate resources of the storage controlling software 54.

(Modification 12)

In the first embodiment described above, the state monitoring program 31 refers to the state feature table 351 to specify a software state of the user application 52. However, the state monitoring program 31 may refer to the job schedule table 43 to specify an operation state of the user application 52. As described above, the job schedule table 43 includes date and time as one of the conditions for activating the user application 52. Therefore, the state monitoring program 31 can specify a user application 52 whose operation state is an activation state on the basis of the description of the job schedule table 43 and the current point of time.

According to the present modification, the following advantageous effect is obtained.

(7) In order to specify the operation state of the user application 52, the job schedule table 43 that is an operation schedule of the user application 52 is used. Therefore, the job schedule table 43 created in advance can be utilized effectively.

(Modification 13)

In the first embodiment described hereinabove, the user application 52 and the storage controlling software 54 that performs data inputting and outputting processes for the user application 52 operate in the same general node C. However, the user application 52 and the storage controlling software 54 that performs data inputting and outputting processes for the user application 52 may operate in general nodes C different from each other. In this case, the monitoring program 30 may operate in any one of a node same as that of the user application 52, a node same as that of the storage controlling software 54, and the other nodes.

According to the present modification, the following advantageous effect is obtained.

(8) The computer system includes a plurality of nodes. The user application 52 and the storage controlling software 54 that performs data inputting and outputting processes for the user application 52 operate in nodes different from each other. Allocation of arithmetic operation resources of the user application 52 and the storage controlling software 54 to the nodes is changed.

(Modification 14)

In the first embodiment described hereinabove, only one piece of storage controlling software 54 performs a process for inputting and outputting data to and from one user application 52. However, a plurality of pieces of storage controlling software 54 may perform a process for inputting and outputting data to and from one user application 52 and may be placed in general nodes C different from each other.

In this case, a plurality of fields for storages 3414 are provided in the required resource amount table 341. Arithmetic operation resources described in the storages 3414 may be same as each other or may be different from each other. In a case where required arithmetic operation resources are different from each other, the values of the arithmetic operation resources may be set, for example, according to a change of the software state, such that allocation of arithmetic operation resources to the storage controlling software 54 placed in one of the nodes is increased while allocation of arithmetic operation resources to the storage controlling software 54 placed in another node is decreased.

For example, the set value corresponding to a software state in which the user application 52 processes a large amount of data may be set such that allocation of arithmetic operation resources to the storage controlling software 54 that operates in a general node C same as that in which the user application 52 operates is set to a relatively low value while allocation of arithmetic operation resources to the storage controlling software 54 that operates in a general node C different from that in which the user application 52 operates is set to a relatively high value.

According to the present modification, the following advantageous effect is obtained.

(9) A plurality of pieces of storage controlling software 54 for performing a process for inputting and outputting data to and from one user application 52 are placed in a plurality of nodes. In a case where the operation state of the user application 52 changes, allocation of arithmetic operation resources to the storage controlling software 54 placed in one of the nodes is increased while allocation of arithmetic operation resources to the storage controlling software 54 placed in another node is decreased. Therefore, allocation of arithmetic operation resources to the storage controlling software 54 placed in the individual noes can be optimized according to the operation state of the user application 52.

Embodiment 2

A second embodiment of the computer system is described with reference to FIGS. 17 and 18. In the following description, like components to those in the first embodiment are denoted by like reference characters, and description is given principally of differences between them. Matters that are not described specifically are same as those in the first embodiment. The computer system of the present embodiment is different from that of the first embodiment in that it also copes with failover.

In the present embodiment, the management software 40 further has a failure coping function for causing, when it detects occurrence of a failure in any of the general nodes C, the user VM 51 that is operating in the general node C to operate in another general node C. The failure coping function is different from a general failover function in that it rewrites also the software operation state management table 352 in addition to the failover function. Further, the software state 3412 of the required resource amount table 341 in the present embodiment includes also information of "during failover" and "after failover" in regard to each piece of software.

Figure 17:
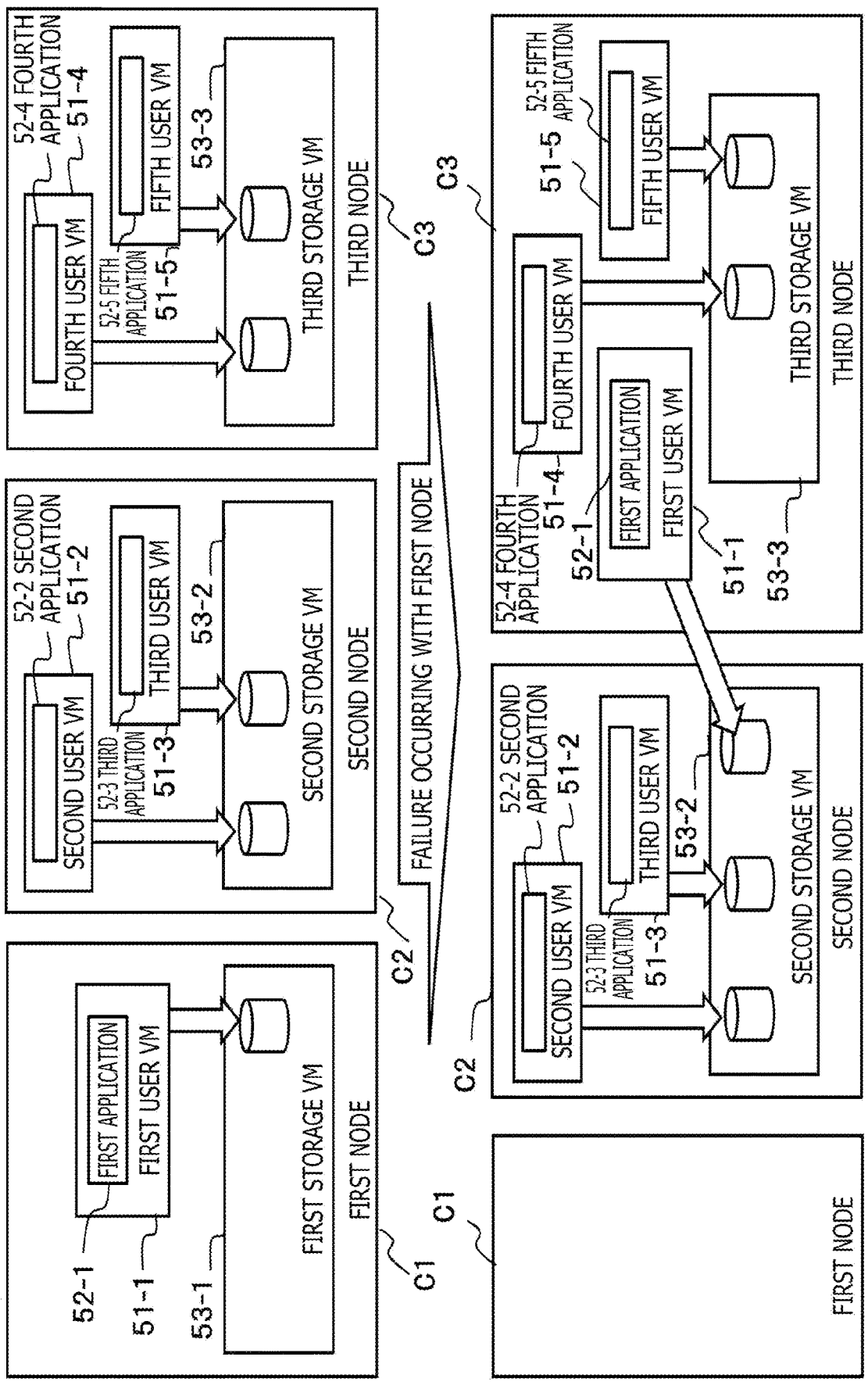
FIG. 17 is a schematic view depicting operation of a computer system according to a second embodiment.

FIG. 17 is a schematic view depicting operation of the computer system according to the present embodiment. In the example depicted in FIG. 17, the computer system includes three general nodes of a first node C1, a second node C2, and a third node C3. An upper portion of FIG. 17 depicts a state before a failure occurs with the first node C1, and a lower portion of FIG. 17 depicts a state after a failure occurs with the first node C1.

The state before occurrence of a failure is described. In the first node C1, a first user VM 51-1 in which a first application 52-1 operates and a first storage VM 53-1 are operating. In the second node C2, a second user VM 51-2 in which a second application 52-2 operates, a third user VM 51-3 in which a third application 52-3 operates and a second storage VM 53-2 are operating. In the third node C3, a fourth user VM 51-4 in which a fourth application 52-4 operates, a fifth user VM 51-5 in which a fifth application 52-5 operates, and a third storage VM 53-3 are operating. The first application 52-1 to fifth application 52-5 are kinds of user application 52.

If a failure occurs with the first node C1, then the management software 40 detects this failure and causes the first application 52-1, which is operating in the first node C1, to operate in the third node C3 that is most affordable in resources. However, since the resource for storage of the third node C3 is not affordable, the first application 52-1 is permitted to utilize the second storage VM 53-2 of the second node C2. Further, the management software 40 sets the software state of the first application 52-1 and the first user VM 51-1 to "during failover" in the software operation state management table 352 in the third node C3.

Thereafter, the resource reallocation program 32 of the third node C3 refers to the required resource amount table 341 to allocate required resources whose software state is "during failover" to the first application 52-1 and the first user VM 51-1. After the failover process is completed, the management software 40 sets the software state of the first application 52-1 and the first user VM 51-1 to "after failover" in the software operation state management table 352 in the third node C3. Consequently, the resource reallocation program 32 of the third node C3 refers to the required resource amount table 341 to allocate the required resources whose software state corresponds to "after failover" to the first application 52-1 and the first user VM 51-1.

Figure 18:
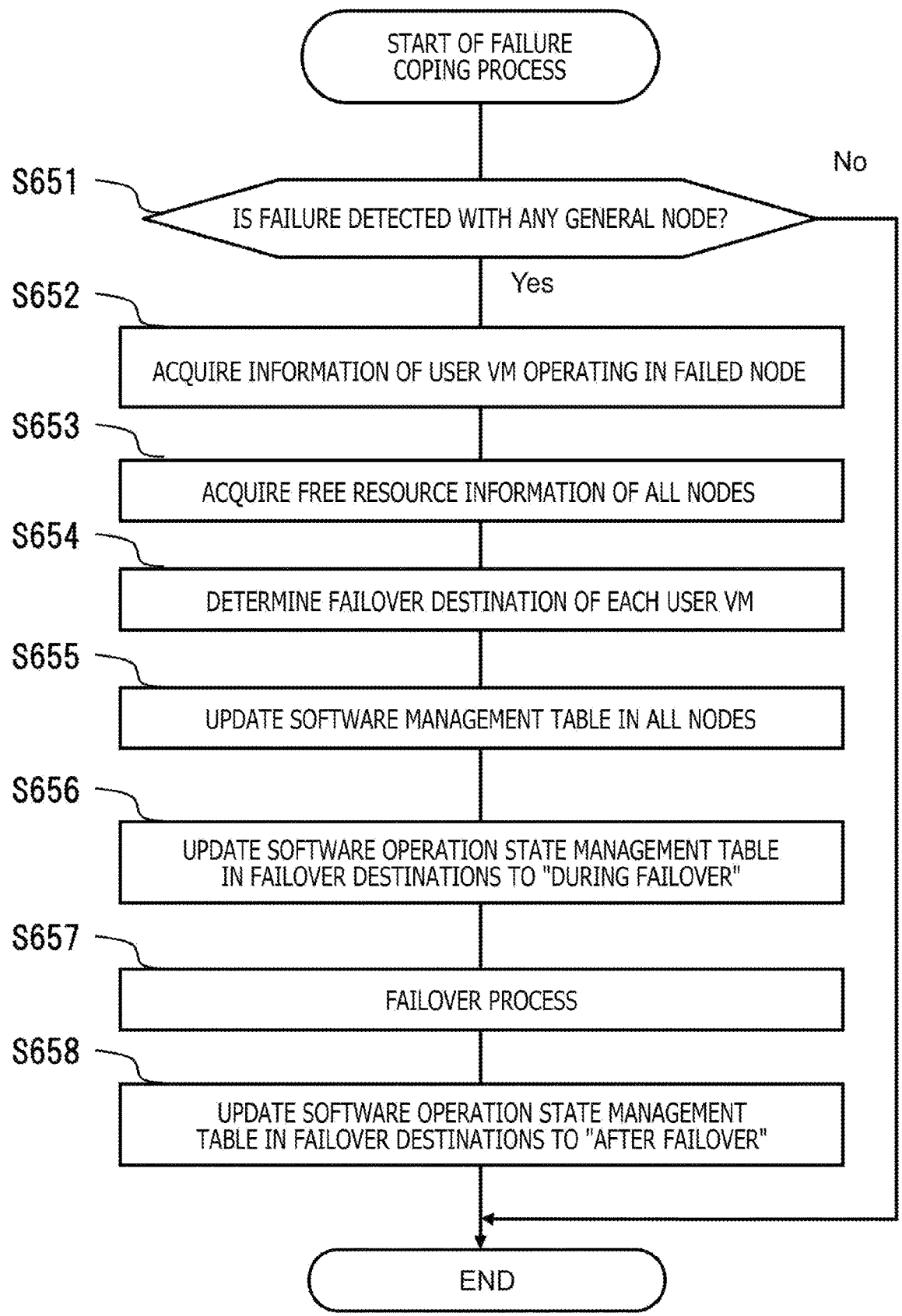
FIG. 18 is a flow chart depicting a failure coping process of management software.

FIG. 18 is a flow chart depicting the failure coping process of the management software 40 in the second embodiment. In the failure coping process, the management software 40 first decides at step S651 whether or not a failure is detected in any of the general nodes. In a case where it is decided that a failure is detected in any of the general nodes, the management software 40 advances the processing to step S652, but in a case where it is decided that a failure is detected in none of the general nodes, the management software 40 ends the process depicted in FIG. 18. It is to be noted that, in the following description, a node in which occurrence of a failure is detected is referred to as a "failed node."

At step S652, the management software 40 acquires information of a user VM that is operating in the failed node. In particular, the management software 40 specifies all user applications 52 that are operating in the user VM. Then at step S653, the management software 40 acquires information of free source information of all general nodes C, namely, information of resources that are not allocated among the CPU core allocation table 344, the memory allocation table 345, the port allocation table 346, and the disk allocation table 347.

Then at step S654, the management software 40 determines a failover destination of each of the user applications 52 that are operating in the failed node specified at step S652. The management software 40 determines, for example, a general node C that has room in resources as a failover destination on the basis of the free resource information acquired at step S653.

At step S655, the management software 40 updates the software management table in all nodes. This update is intended to reflect the determination at step S654, and the node number and so forth of the user applications 52 that have been operating in the failed node are rewritten. At next step S656, the management software 40 rewrites the software operation state management table 352 of the general nodes C of the failover destinations determined at step S654. In particular, the management software 40 rewrites the software operation state regarding each user application 52 having been operating in the failed node to "during failover."

At next step S657, the management software 40 performs a known failover process. When this failover process is completed, the management software 40 rewrites the software operation state management table 352 of the general nodes C of the failover destination at step S658. In particular, the management software 40 rewrites the software operation state of the user applications 52, which have been operating in the failed node, to "after failover." The description with reference to FIG. 18 ends therewith.

According to the second embodiment described above, the following advantageous effect is obtained.

(10) The operation state of software includes during failover indicating that a switching process arising from occurrence of a failure is proceeding and after failover indicating that the switching process is completed. The monitoring program 30 recognizes the operation state of software according to the progress of the failover process. Therefore, arithmetic operation resources R suitable for each of software states during failover and after failover can be allocated to the software.

(Modification 1 of Embodiment 2)

In the second embodiment described above, the management software 40 executes the failover process. However, software other than the management software 40 may execute the failover process. In the description of the present modification, operation of the management software 40 is described assuming that failover software for executing the failover process is provided in the management node M. In this case, the management software 40 acquires the name of software that is a target of failover and information of a node of a failover destination from the failover software and performs the processes at steps S655 and S656 of FIG. 18.

Further, the management software 40 receives a notification that failover is completed from the failover software and performs the process at step S658 of FIG. 18. It is to be noted that, although it is assumed that, in the present modification, the failover software is provided in the management node M, the failover software may operate in any node other than the management node M.

Embodiment 3

A third embodiment of the computer system is described with reference to FIG. 19. In the following description, like components to those in the first embodiment are denoted by like reference characters, and description is given principally of differences between them. Matters that are not described specifically are same as those in the first embodiment. The computer system according to the present embodiment is different from that of the first embodiment in that the management node further includes an interface for operating the job schedule table 43.

Figure 19:
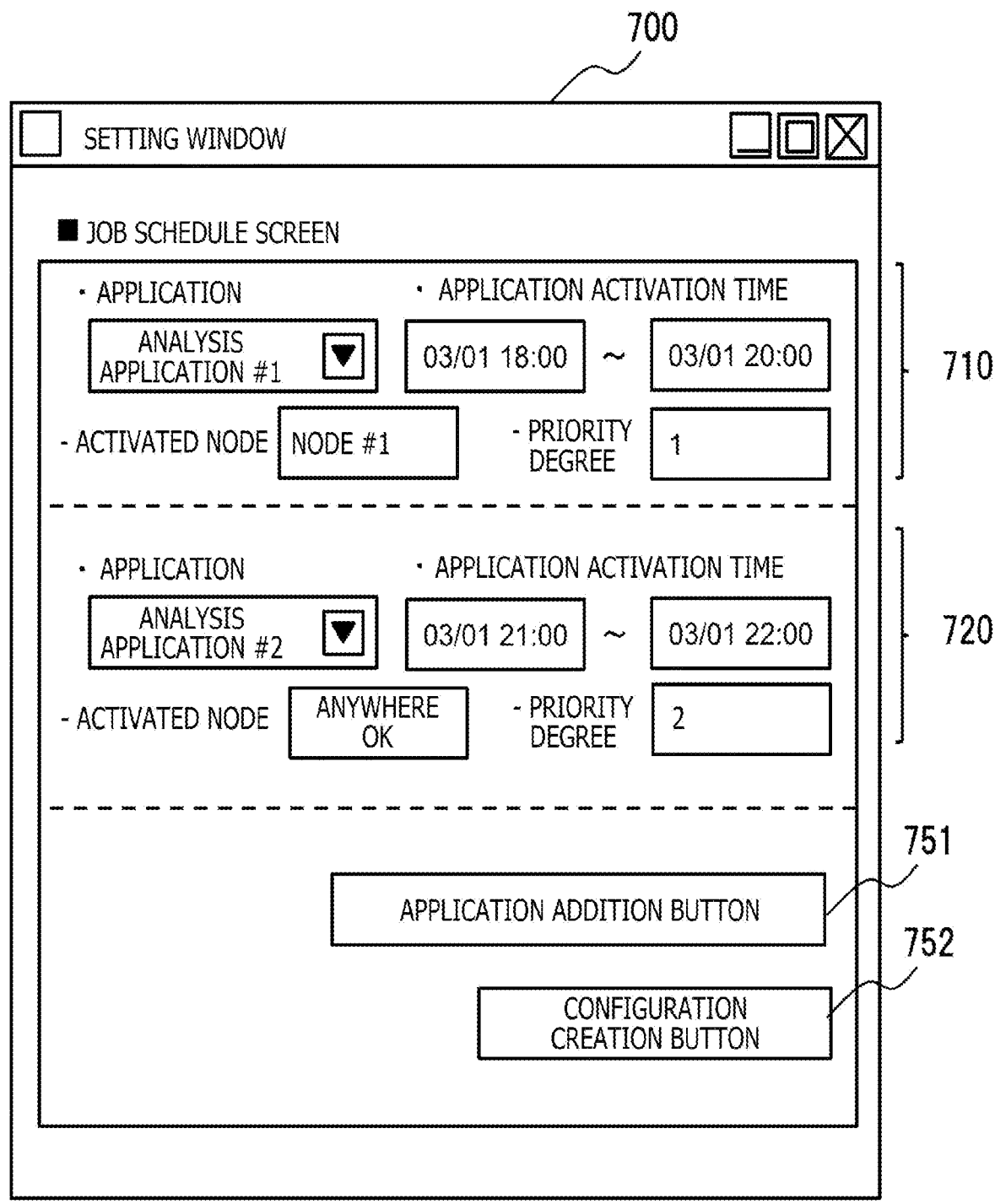
FIG. 19 is a view depicting an example of a job schedule setting screen in a third embodiment.

FIG. 19 is a view depicting an example of a job schedule setting screen 700 included in the management node M. The job schedule setting screen 700 has one or more application setting areas. In the example depicted in FIG. 19, the job schedule setting screen 700 includes a first application setting area 710, a second application setting screen 720, an application addition button 751, and a configuration creation button 752.

In each of the application setting areas, setting fields for selection of an application, activation time of the application, end time of the application, an activation node, and a priority degree are provided. If the application addition button 751 is depressed, then an application setting area is added. If the configuration creation button 752 is depressed, then information inputted to an application setting area is added to the job schedule table 43.

The job scheduler 42 causes a predetermined user application 52 to operate according to the description of the job schedule table 43 as described hereinabove. In the present embodiment, an activation node of an application can be designated in the job schedule table 43, and in a case where a resource is insufficient in the node, a greater amount of resources is allocated in the descending order of the priority degree. It is to be noted that setting of an activation node and a priority degree on the job schedule setting screen 700 is not essentially required and such setting columns as described above may not be provided.

According to the third embodiment described above, a job schedule can be added manually.

(Modification of Embodiment 3)

The job scheduler 42 may be placed in each of the general nodes C. In this case, the job scheduler 42 placed in the general nodes C may suitably refer to the job schedule table 43 included in the management node M. Further, the job scheduler 42 placed in the general nodes C may extract and acquire only a required portion of the job schedule table 43, for example, only jobs to be executed in the general node C in which the job scheduler 42 is placed, from the job schedule table 43.

Embodiment 4

A fourth embodiment of the computer system is described with reference to FIG. 20. In the following description, like components to those in the first embodiment are denoted by like reference characters, and description is given principally of differences between them. Matters that are not described specifically are same as those in the first embodiment. The computer system of the present embodiment is different from that of the first embodiment in that it has an update program.

In the present embodiment, the monitoring program 30 further has an update program 37 for executing an update process described below. The update process is a process for updating the state feature table 351, the IO past statistics table 361, and the job schedule table 43. It is to be noted that the update program 37 may directly rewrite the job schedule table 43 stored in the management node M or may upload an updated job schedule table 43 to the management node M such that job schedule table 43 is rewritten as an internal process of the management node M.

If the update program 37 detects a characteristic operation of each piece of software that is not described in the state feature table 351, then it creates a new record in the state feature table 351 and records the characteristic. Further, the update program 37 monitors the IO count table 362, and if it detects a characteristic value that is not described in the IO past statistics table 361, then it creates a new record in the IO past statistics table 361 and records the characteristic value. Furthermore, if the update program 37 detects a feature of a timing of at least one of activation and end of each piece of software, then it creates a new record in the job schedule table 43 and records the feature.

Figure 20:
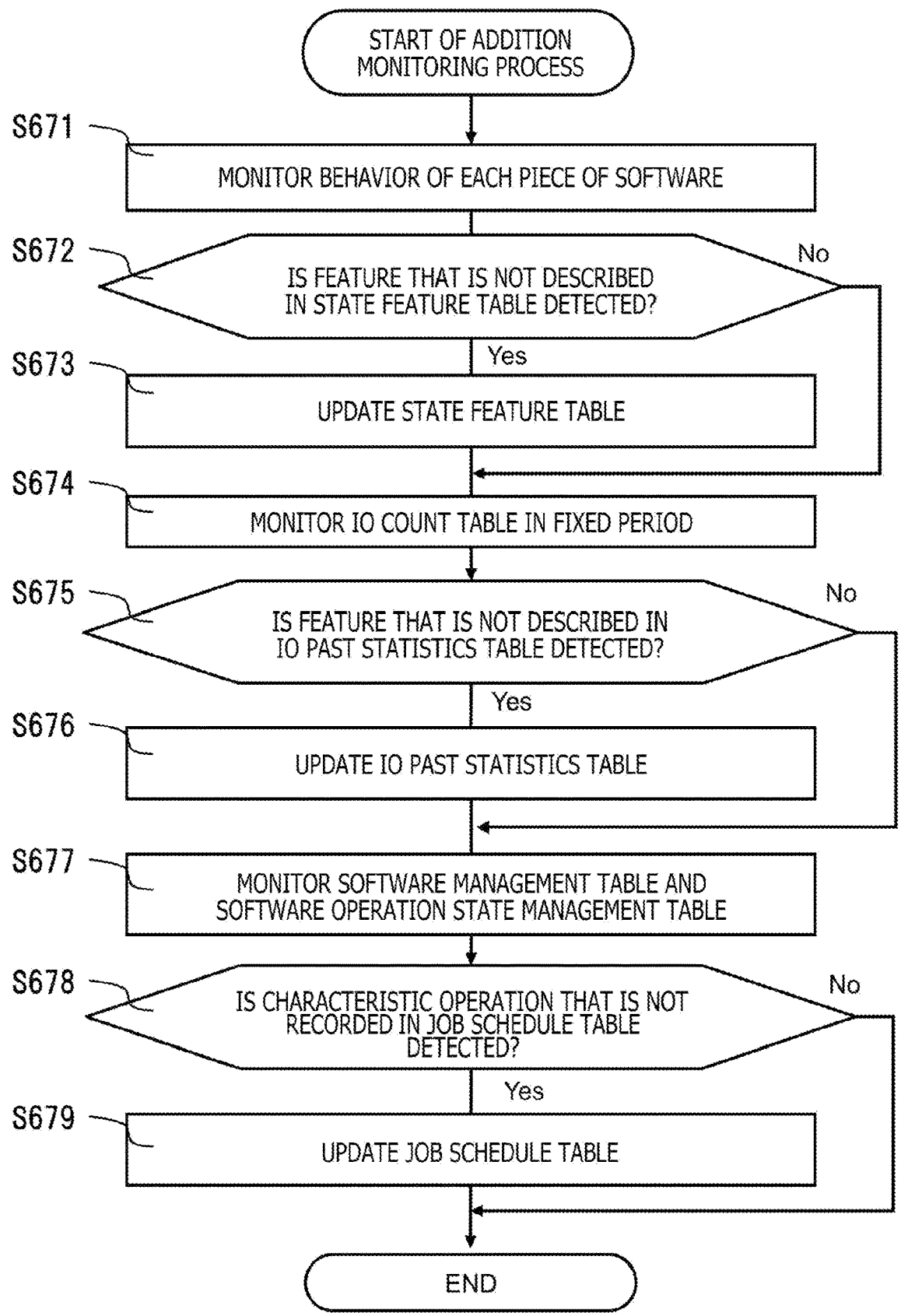
FIG. 20 is a flow chart depicting operation of an update program in a fourth embodiment.

FIG. 20 is a flow chart depicting operation of the update program 37. First at step S671, the update program 37 monitors the behavior of each piece of software in the node. At step S672, the update program 37 decides whether or not a feature that is not described in the state feature table 351 is detected. In a case where it is decided that a feature that is not described in the state feature table 351 is detected, the update program 37 advances the processing to step S673, but in a case where it is decided that a feature that is not described in the state feature table 351 is not detected, the update program 37 advances the processing to next step S674. At step S673, the update program 37 writes the detected feature into the new record of the state feature table 351, and then the processing advances to step S674.

At step S674, the update program 37 monitors the IO count table 362 at fixed intervals. At next step S675, the update program 37 decides whether or not a feature that is not described in the IO past statistics table 361 is detected. In a case where the update program 37 decides that a feature that is not described in the IO past statistics table 361 is detected, it advances the processing to step S676, but if the update program 37 decides that a feature that is not described in the IO past statistics table 361 is not detected, it advances the processing to step S677. At step S676, the update program 37 writes the detected feature into the new record of the IO past statistics table 361 and then advances the processing to step S677.

At step S677, the update program 37 monitors the software management table 342 and the software operation state management table 352. Then at step S678, the update program 37 decides whether or not a characteristic operation that is not recorded in the job schedule table 43 is detected. In a case where the update program 37 decides that a characteristic operation that is not recorded in the job schedule table 43 is detected, it advances the processing to step S679. In a case where the update program 37 decides that a characteristic operation that is not recorded in the job schedule table 43 is not detected, it ends the process of FIG. 20. At step S679, the update program 37 records the detected feature into the new record of the job schedule table 43 and ends the process of FIG. 20.

According to the fourth embodiment described above, the state feature table 351, the IO past statistics table 361, and the job schedule table 43 can be updated automatically.

(Modification of Embodiment 4)

In the fourth embodiment, it is sufficient if at least one of update of the state feature table 351, update of the IO past statistics table 361, and update of the job schedule table 43 is carried out.

In the embodiments and the modifications described above, the configurations of the functional blocks are mere examples. Several functional configurations indicated as separate functional blocks may be configured integrally, and a configuration represented by one functional block diagram may be divided into two or more functions. Further, part of the functions each functional block has may be configured so as to be provided in another functional block.

In the embodiments and the modifications described above, each general node C may include an input/output interface not depicted such that, when necessary, a program, especially the monitoring program 30, may be read in from another apparatus through the input/output interface and a medium that can be utilized by the general node C. Here, the medium is, for example, a recording medium that is removably mounted on the input/output interface or a communication medium, for example, a wired, wireless or optical network or a carrier or a digital signal that propagates in the network. Further, part of the functions implemented by the program may be implemented partly or entirely from a hardware circuit or a field-programmable gate array (FPGA).

The embodiments and the modifications described above may be combined suitably. Although the various embodiments and modifications are described above, the present invention is not restricted to the contents of them. Any other modes that are conceivable without departing from the technical idea of the present invention also fall within the scope of the present invention.

What is claimed is:

1. A computer system for improving an allocation of processing resources in a computer network, the computer system comprising a memory;

a communication interface;

and a processor that is communicatively coupled to the memory and the communication interface, wherein the processor is configured to:

receive, using the communication interface, a request to activate a designated piece of software, wherein the designated piece of software includes at least one of an application program that operates using arithmetic operation resources of the computer network or a storage controlling program that operates using the arithmetic operation resources for processing data to be inputted to and outputted from a storage device of the computer network by the application program, allocate a first allocation of the arithmetic operation resources to the designated piece of software, trigger an activation of the designated piece of software using the first allocation, monitor the activation of the designated piece of software, and reduce the first allocation of the arithmetic operation resources to a second allocation of arithmetic operation resources when the activation of the designated piece of software is completed;

wherein an operation state of the application program is detected and allocation of the arithmetic operation resources is changed on a basis of a detected operation state of the application program and the resource amount information;

wherein the operation state of the application program includes a during failover state that changes according to progress of a failover process and in which a switching process accompanied by occurrence of a failure is performed and an after failover state in which the switching process is completed.

2. The computer system according to claim 1, wherein: the processor is further configured to store resource amount information that associates operation states of the application program and the arithmetic operation resources, resources that are the arithmetic operation resources to be used by the storage controlling program and become a target of change of allocation include the processor and the memory, and an allocation arithmetic operation resource change by one time possibly includes an arithmetic operation resource whose allocation increases and the arithmetic operation resource whose allocation decreases on a basis of the resource amount information.

3. The computer system according to claim 1, wherein an operation schedule of the application program is used as operation state of the application program and allocation of the arithmetic operation resources is changed on a basis of the operation schedule of the application program.

4. The computer system according to claim 1, wherein the computer network comprises a plurality of nodes, the application program and the storage controlling program that performs a process for inputting and outputting data of the application program operate in different ones of the nodes, and allocation of the arithmetic operation resources in individual nodes among the plurality of nodes to the application program and the storage controlling program is changed.

5. The computer system according to claim 1, wherein a plurality of storage controlling programs that perform a data inputting and outputting process of the application program are placed in a plurality of nodes that comprise the computer network, and in a case where an operation state of the application program changes, allocation of the arithmetic operation resources to the storage controlling program placed in one of the nodes is increased while allocation of the arithmetic operation resources to the storage controlling program placed in another of the nodes is decreased.

6. The computer system according to claim 1 wherein state feature information indicating a feature for each operation state of the application program is further stored, and the operation state of the application program is decided on a basis of the state feature information.

7. The computer system according to claim 1 wherein the operation state of the application program is decided on a basis of an IO processing number of the application program or the storage controlling program.

8. A method for improving an allocation of processing resources in a computer network, method comprising:
receiving, by a processor, a request to activate a designated piece of software, wherein the designated piece of software includes at least one of an application program that operates using arithmetic operation resources of network or a storage controlling program that operates using the arithmetic operation resources for processing data to be inputted to and outputted from a storage device of the computer network by the application program,
allocating, by the processor, a first allocation of the arithmetic operation resources to the designated piece of software,
triggers an activation of the designated piece of software using the first allocation,
monitoring, by the processor, the activation of the designated piece of software, and reducing, by the processor, the first allocation of the arithmetic operation resources to a second allocation of arithmetic operation resources when the activation of the designated piece of software is complete;
wherein an operation state of the application program is detected and allocation of the arithmetic operation resources is changed on a basis of a detected operation state of the application program and the resource amount information;
wherein the operation state of the application program includes a during failover state that changes according to progress of a failover process and in which a switching process accompanied by occurrence of a failure is performed and an after failover state in which the switching process is completed.

9. A non-transitory computer readable storage medium storing instructions for improving an allocation of processing resources in a computer network, the instructions when executed by a processor cause the processor to execute a method comprising:
receiving, by the processor, a request to activate a designated piece of software, wherein the designated piece of software includes at least one of an application program that operates using arithmetic operation resources of the computer network or a storage controlling program that operates using the arithmetic operation resources for processing data to be inputted to and outputted from a storage device of the computer network by the application program,
allocating, by the processor, a first allocation of the arithmetic operation resources to the designated piece of software,
triggers an activation of the designated piece of software using the first allocation, monitoring, by the processor, the activation of the designated piece of software, and reducing, by the processor, the first allocation of the arithmetic operation resources to a second allocation of arithmetic operation resources when the activation of the designated piece of software is complete;
wherein an operation state of the application program is detected and allocation of the arithmetic operation resources is changed on a basis of a detected operation state of the application program and the resource amount information;
wherein the operation state of the application program includes a during failover state that changes according to progress of a failover process and in which a switching process accompanied by occurrence of a failure is performed and an after failover state in which the switching process is completed.

\* \* \* \* \*